United States Patent
Abrudan et al.

(10) Patent No.: US 12,061,281 B2
(45) Date of Patent: Aug. 13, 2024

(54) POSITIONING SYSTEM DEPLOYMENT

(71) Applicant: Nokia Solutions and Networks Oy, Espoo (FI)

(72) Inventors: Traian Abrudan, Espoo (FI);
Veli-Matti Kolmonen, Espoo (FI);
Holger Claussen, Dublin (IE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 172 days.

(21) Appl. No.: 17/478,100

(22) Filed: Sep. 17, 2021

(65) Prior Publication Data
US 2022/0099789 A1  Mar. 31, 2022

(30) Foreign Application Priority Data
Sep. 25, 2020  (FI) .................................... 20205928

(51) Int. Cl.
*G01S 5/02*  (2010.01)
*G01S 5/08*  (2006.01)

(52) U.S. Cl.
CPC .......... *G01S 5/0289* (2013.01); *G01S 5/0218* (2020.05); *G01S 5/0273* (2013.01); *G01S 5/08* (2013.01)

(58) Field of Classification Search
CPC .... G01S 5/0218; G01S 5/0273; G01S 5/0289; G01S 5/08
See application file for complete search history.

(56) References Cited

U.S. PATENT DOCUMENTS 6,421,007 B1   7/2002  Owen et al.
6,484,031 B1 * 11/2002  Ruutu .................. H04W 64/00
                                                    342/463
(Continued)

FOREIGN PATENT DOCUMENTS

GB         2380881 A  *  4/2003  ............... G01S 5/08
WO  WO-2019072062 A1 *  4/2019  .......... G01S 5/0252

OTHER PUBLICATIONS

Fischler et al., "Random Sample Consensus: A Paradigm for Model Fitting with Applications to Image Analysis and Automated Cartography", Communications of the ACM, vol. 24, No. 6, Jun. 1981, pp. 381-395.
Shotton et al., "Scene Coordinate Regression Forests for Camera Relocalization in RGB-D Images", IEEE Conference on Computer Vision and Pattern Recognition, Jun. 23-28, 2013, pp. 2930-2937.
Talvitie et al., "Novel Algorithms for High-Accuracy Joint Position and Orientation Estimation in 5G mmWave Systems", IEEE Globecom Workshops (GC Wkshps), Dec. 4-8, 2017, 7 pages.

(Continued)

*Primary Examiner* — Whitney Moore
(74) *Attorney, Agent, or Firm* — SQUIRE PATTON BOGGS (US) LLP

(57) ABSTRACT

Inter-alia, a method is disclosed comprising: obtaining, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network; obtaining, for the at least one reference position, a weighted estimate of the representative direction based on at least an angular weighting function for the at least one reference position, the angular weighting function being representative at least of an aperture of at least one antenna of the node of the communication network; and obtaining information indicative at least of an orientation and/or position of the node of the communication network at (Continued)

least based on the weighted estimate of the representative direction obtained for the at least one reference position.

19 Claims, 6 Drawing Sheets

(56) References Cited

U.S. PATENT DOCUMENTS

| | | | | |
|---|---|---|---|---|
| 7,577,446 | B2* | 8/2009 | Guvenc | G01S 5/0273 |
| | | | | 455/67.11 |
| 8,688,140 | B2 | 4/2014 | Nemeth | |
| 8,791,860 | B2 | 7/2014 | Edelhaeusser et al. | |
| 9,885,774 | B2 | 2/2018 | Kumar et al. | |
| 10,433,274 | B2 | 10/2019 | Jamieson et al. | |
| 10,612,939 | B2 | 4/2020 | Kikkeri et al. | |
| 2009/0191894 | A1* | 7/2009 | Poegel | G01S 5/02213 |
| | | | | 455/456.1 |
| 2016/0334498 | A1 | 11/2016 | Jamieson et al. | |
| 2017/0356979 | A1* | 12/2017 | Georgiou | H04W 4/023 |
| 2018/0076875 | A1* | 3/2018 | Haverinen | G01S 3/14 |
| 2019/0265367 | A1 | 8/2019 | Silverman et al. | |
| 2019/0281574 | A1* | 9/2019 | Reial | G01S 5/10 |
| 2020/0150216 | A1* | 5/2020 | Shpak | G01S 5/10 |

OTHER PUBLICATIONS

Soltanaghaei et al., "Multipath Triangulation: Decimeter-level WiFi Localization and Orientation with a Single Unaided Receiver", Proceedings of the 16th Annual International Conference on Mobile Systems, Applications, and Services, Jun. 2018, pp. 376-388.

Ayyalasomayajula et al., "LocAP: Autonomous Millimeter Accurate Mapping of WiFi Infrastructure", Proceedings of the 17th USENIX Symposium on Networked Systems Design and Implementation (NSDI '20), Feb. 25-27, 2020, pp. 1115-1129.

"High Accuracy Indoor Positioning", Nokia, Retrieved on Sep. 8, 2021, Webpage available at : https://www.dac.nokia.com/applications/high-accuracy-positioning/.

Al-Qahtani et al., "Improved residual weighting for NLOS mitigation in TDOA-based UWB positioning systems", 21st International Conference on Telecommunications (ICT), May 4-7, 2014, pp. 211-215.

Zhang et al., "Angle of Arrival Passive Location Algorithm Based on Proximal Policy Optimization", Electronics, vol. 8, 2019, pp. 1-17.

Office action received for corresponding Finnish Patent Application No. 20205928, dated Jan. 12, 2021, 9 pages.

* cited by examiner

POSITIONING SYSTEM DEPLOYMENT

FIELD

The following disclosure relates to the field of positioning, or more particularly relates to systems, apparatuses, and methods for enabling accurate position and/or orientation information determining of a node of a communication network.

BACKGROUND

Position information has become popular in many applications such as for example for tracking of goods in warehouses, for locating vehicles and/or tools in industrial environments, and/or for navigation. Outdoors, for example GPS provides particularly beneficial positioning and/or tracking solutions. For indoors, different solutions exist that have different advantages and drawbacks. For example, camera-based solutions are very accurate, but their performance degrades quickly in low illumination conditions, and in presence of obstructions. Radio Frequency (RF) wave based solutions on the other hand, are able to penetrate or even alleviate small obstacles due to diffraction, but they undergo harsh multipath and Non-Line-of-Sight (NLOS) propagation.

Nevertheless, RF based solutions are very attractive for example as such solutions may enable reuse of existing communication infrastructure (such as WiFi, Bluetooth, and/or 5G infrastructures) to provide positioning services in addition to communication. Among existing positioning and/or tracking methods including signal strength methods based on environment fingerprinting, Time-of-Arrival (ToA) and/or Time-Difference-of-Arrival (TDOA) methods, Angle-of-Arrival (AoA), Angle-of-Departure (AoD) based methods may be desirable as they usually do not require a large bandwidth and may thus be suitable for asset tracking, such as tracking of narrow-band Internet of Things (IoT) devices and/or automated guided vehicles (AGVs).

For enabling positioning and/or tracking of devices, a corresponding localization system is usually provided with one or more nodes, such as nodes of respective communication networks, e.g. in particular WiFi, Bluetooth and/or 5G nodes. Usually, spatial placement of such nodes is known with respect to a map, in order to provide coordinates of a user or device with respect to the map. In case of AoA and/or AoD based positioning systems, a 3D orientation of respective nodes has to be known in addition to a corresponding 3D position.

However, in particular measurements of 3D orientations of nodes may be challenging in particular in industrial environments, where access to respective nodes e.g. for manual measurements may be limited. Therefore installations of nodes in particular of AoA and/or AoD based positioning systems may be prone to errors in particular in 3D orientation of respective nodes, whereby errors e.g. below 5 degrees may on the one hand be hardly noticeable, in particular in environments e.g. without references for aligning orientations of nodes such as walls, however may on the other hand degrade positioning accuracy of the system, especially at long ranges.

SUMMARY OF SOME EXEMPLARY EMBODIMENTS

In view of this, it is desirable to provide a method enabling an AoA and/or AoD positioning system to calibrate itself in an automatized manner. However, while e.g. solutions may exist that may enable determination of position and orientation (in combination also referred to as pose) of cameras, such solutions are not applicable to nodes of an AoA positioning system. For example, camera pose determination solutions are in particular not capable of taking into account multipath and/or NLOS signal propagation which may occur in AoA and/or AoD based systems and which may cause considerable errors in position/orientation determination.

It is thus, inter alia, an object of the invention to enable a determination of a pose in particular of a node of a communication network, the determination being robust in view of multipath and/or NLOS signal propagation.

According to a first exemplary aspect of the present invention, a method is disclosed, the method comprising:
- obtaining, for at least one reference position, an estimate of a representative direction from a node of a communication network to at least one reference position based on at least one directional measurement indicative at least of a propagation direction of a signal communicated between the at least one reference position and the node of the communication network;
- obtaining, for the at least one reference position, a weighted estimate of the representative direction based on at least an angular weighting function for the at least one reference position, the angular weighting function being representative at least of an aperture of at least one antenna of the node of the communication network; and
- obtaining information indicative at least of an orientation and/or position of the node of the communication network at least based on the weighted estimate of the representative direction obtained for the at least one reference position.

This method may for instance be performed and/or controlled by an apparatus, e.g. enabling a network side. For instance, the apparatus may be or provide a function of a mobile communication network, e.g. a Location Management Function (LMF), and/or a Location Management Component (LMC). The apparatus may for instance be a server, e.g. a positioning server e.g. of or in communication with the mobile communication network. Alternatively, this method may be performed and/or controlled by more than one apparatus, for instance a server cloud comprising at least two servers. For instance, the method may be performed and/or controlled by using at least one processor of the apparatus.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

Thus, according to a further exemplary aspect of the invention, a first apparatus is disclosed comprising means for:

obtaining, for at least one reference position, an estimate of a representative direction from a node of a communication network to at least one reference position based on at least one directional measurement indicative at least of a propagation direction of a signal communicated between the at least one reference position and the node of the communication network;

obtaining, for the at least one reference position, a weighted estimate of the representative direction based on at least an angular weighting function for the at least one reference position, the angular weighting function being representative at least of an aperture of at least one antenna of the node of the communication network; and obtaining information indicative at least of an orientation and/or position of the node of the communication network at least based on the weighted estimate of the representative direction obtained for the at least one reference position.

The means of the apparatus can be implemented in hardware and/or software. They may comprise for instance at least one processor for executing computer program code for performing the functions, at least one memory storing the program code, or both. Alternatively, they could comprise for instance circuitry that is designed to implement the functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise the disclosed components, for instance means, processor, memory, or may further comprise one or more additional components.

According to a second exemplary aspect of the present invention, a method is disclosed, the method comprising:

providing information for causing a first apparatus to:
obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;

obtain, for the at least one reference position, a weighted estimate of the representative direction based on at least an angular weighting function for the at least one reference position, the angular weighting function being representative at least of an aperture of at least one antenna of the node of the communication network; and obtain information indicative at least of an orientation and/or position of the node of the communication network at least based on the weighted estimate of the representative direction obtained for the at least one reference position.

This method may for instance be performed and/or controlled by an apparatus, e.g. a mobile device, such as an automated guided vehicle (AGV), and/or an Internet-of-Things (IoT) device, a User Equipment (UE) and/or the node of the communication network. For instance, the method may be performed and/or controlled by using at least one processor of the apparatus.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

Thus, according to a further exemplary aspect of the invention, a second apparatus is disclosed comprising means for:

providing information for causing a first apparatus to:
obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;

obtain, for the at least one reference position, a weighted estimate of the representative direction based on at least an angular weighting function for the at least one reference position, the angular weighting function being representative at least of an aperture of at least one antenna of the node of the communication network; and obtain information indicative at least of an orientation and/or position of the node of the communication network at least based on the weighted estimate of the representative direction obtained for the at least one reference position.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise the disclosed components, for instance means, processor, memory, or may further comprise one or more additional components.

According to a third exemplary aspect of the present invention, a method is disclosed, the method comprising:
  providing, by at least one second apparatus, information for causing a first apparatus to:
  obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;
  obtain, for the at least one reference position, a weighted estimate of the representative direction based on at least an angular weighting function for the at least one reference position, the angular weighting function being representative at least of an aperture of at least one antenna of the node of the communication network;
  obtain information indicative at least of an orientation and/or position of the node of the communication network at least based on the weighted estimate of the representative direction obtained for the at least one reference position;
  obtaining, by the at least one first apparatus, for the at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;
  obtaining, for the at least one reference position, a weighted estimate of the representative direction based on at least an angular weighting function for the at least one reference position, the angular weighting function being representative at least of an aperture of at least one antenna of the node of the communication network; and
  obtaining information indicative at least of an orientation and/or position of the node of the communication network at least based on the weighted estimate of the representative direction obtained for the at least one reference position.

This method may for instance be performed and/or controlled by at least one first apparatus configured to perform and/or control the method according to the first exemplary aspect and by at least one second apparatus configured to perform and/or control the method according to the second exemplary aspect. The at least one first apparatus may for instance be an apparatus according to the first exemplary aspect. The at least one second apparatus may for instance be an apparatus according to the second exemplary aspect.

According to an exemplary embodiment of all exemplary aspects, the respective method(s) according to the first, second and/or third exemplary aspect may be performed and/or controlled at least periodically to enable determining of an orientation and/or position of a node of a communication network.

According to a further exemplary aspect of the invention, a system is disclosed, comprising:
  at least one first apparatus according to the first exemplary aspect of the invention as disclosed above, and at least one second apparatus according to the second exemplary aspect of the invention as disclosed above.

In the following, exemplary features and exemplary embodiments of all aspects of the present invention will be described in further detail.

In an exemplary embodiment, a node of a communication network is a Wireless Local Area Network, WLAN, access point, a Bluetooth access point and/or an access point of a cellular communications network. WLAN is for example specified by the standards of the IEEE 802.11 family (http://www.ieee.org/). A cellular communications network may for example be a mobile phone network like a 2G/3G/4G/5G/New Radio (NR) and/or future cellular communication network. The 2G/3G/4G/5G/NR cellular radio communication standards are developed by the 3GPP and presently available under http://www.3gpp.org/.

Thus, addressing the above object, a representative direction is obtained from a node of a communication network such as in particular a WLAN, a Bluetooth and/or a 5G/NR access point to a reference point based on at least one directional measurement that is indicative of a propagation direction of a signal communicated between the at least one reference position and the node of the communication network. Thereby, in an exemplary embodiment, the signal may be a signal from the at least one reference position to the node of the communication network. Alternatively or in addition, in an exemplary embodiment, the signal may be a signal from the node of the communication network to the at least one reference position. For example, one or more reference tags configured for signal transmission and/or reception, e.g. being respectively provided with a suitable (e.g. single) transmit and/or receive antenna, may be placed at one or more, in particular at four, reference positions.

The node of the communication network may be configured to obtain a directional measurement for a respective one of such reference tags by measuring an Angle-of-Arrival (AoA) of a signal received at the node from the respective reference tag. Thereby, a representative direction may be a direction obtained for a respective one of the reference positions and/or reference tags based on one or more directional measurements obtained based on one or more signals from the respective one of the reference positions and/or reference tags, e.g. as a weighted or non-weighted average of such directional measurements.

Alternatively or on addition, the node of the communication network may be configured to obtain a directional measurement for a respective one of such reference tags from the respective one of the reference tags, the respective reference tag being configured for measuring an Angle-of-Departure (AoD) of a signal received at the respective reference tag from the node of the communication network. For example, the node of the communication network may comprise two or more antennas for signal transmission and the reference tag (using e.g. a single antenna) may be configured to estimate the AoD by measuring phase differences between individual signals received from respective ones of the at least two antennas of the node of the communication network.

It should be noted that the reference tag may correspond to an exemplary embodiment of the at least one second apparatus. In alternative or additional exemplary embodiments, a mobile device and/or an IOT device and/or an AGV device may be provided at one or more of the reference positions. Any of such examples of a second apparatus may be provided for transmitting a signal to the node of the communication network to enable an AoA measurement at the node of the communication network and/or for determining an AoD of one or more signals received from the node of the communication network and to provide a corresponding directional measurement to the node of the communication network. In an exemplary embodiment, an autonomous robot configured for self-localization may be employed as an example of the second apparatus.

According to the first aspect, the first apparatus is configured for obtaining, for the at least one reference position, a weighted estimate of the representative direction based on at least an angular weighting function for the at least one reference position, the angular weighting function being representative at least of an aperture of at least one antenna of the node of the communication network. Thereby, the angular weighting function may take account of an angular dependence of sensitivity of signal reception of the node of the communication network. For example, as a result of such angular dependence of reception sensitivity, a signal received along a central direction within an aperture of one or more antennas or an antenna system of the node of the communication network, may be more reliable as a signal received along a direction at an angle corresponding to a limit of an angular range corresponding to said aperture. In accordance with such (e.g. known in advance) property of the node of the communication system, the angular weighting function may be provided (e.g. designed) to attribute a larger weight to estimated directions along a central direction as compared to directions with angles close to respective limits of said angular range. The angular weighting function may further be designed such that directions corresponding to angles at respective edges of said angular range are discarded, e.g. by setting a corresponding weight to zero.

The first apparatus is further configured for obtaining information indicative at least of an orientation and/or position of the node of the communication network at least based on the weighted estimate of the representative direction obtained for the at least one reference position. To this end, the first apparatus may in an exemplary embodiment be configured to combine, based on the respective weight, two or more representative directions estimated for two or more corresponding reference positions, respectively estimated based on one or more directional measurements for a corresponding reference position. In this way, the first apparatus is in an exemplary embodiment configured to obtain an orientation of the node of the communication network and is further configured for obtaining information indicative of a position of the node of the communication network at least based on the weighted estimate of the representative direction obtained for the at least one reference position.

Further, reference positions may be distributed within a three-dimensional volume covered by the aperture of the one or more antennas of the node of the communication system. As a result, in an exemplary embodiment, the first apparatus is configured for obtaining a three-dimensional orientation and/or a three-dimensional position of the node of the communication network.

In particular the angular weighting function employed in the method according to the first aspect, may help to mitigate, at least in part errors that may be caused by NLOS signal propagation which may occur in particular in case of radio frequency (RF) based positioning and/or tracking systems such as indoor positioning and/or tracking systems based on WLAN, Bluetooth and/or 5G communication systems.

Further, by enabling determination of a three-dimensional orientation and/or position (e.g. a three dimensional pose) of at least one node of a communication system, e.g. of a WLAN, Bluetooth, and/or 5G communication system, the method according to the first aspect may advantageously enable in particular an automatized calibration of such positioning and/or tracking system. Thus, in an exemplary embodiment, the method according to the first aspect is performed at least as part of a calibration process for calibrating a radio frequency (RF) based positioning and/or tracking system, in particular indoor positioning and/or tracking system.

According to an exemplary embodiment of the first exemplary aspect, the method further comprises:
obtaining, for the at least one reference position, the information indicative of the at least one directional measurement, the at least one directional measurement being indicative at least of one of:
an Angle-of-Arrival (AoA) of a signal from the reference position at the node of the communication network;
an Angle-of-Departure, AoD, of a signal from the node of the communication network at the reference position.

For example, the node of the communication network may be configured to estimate an Angle-of-Arrival of a signal (a wireless signal) received from the at least one reference position, e.g. being transmitted from the second apparatus, e.g. from a reference tag, a mobile device, an IOT and/or an AGV device. For example, to this end, the node of the communication network may employ am inverse beamforming, e.g. based on time difference of arrival (TDOA) measured at respective antennas and/or antenna elements that may in an exemplary embodiment be provided at the node of the communication network.

Alternatively or in addition, the node of the communication network may obtain, for the at least one reference position, the information indicative of the at least one directional measurement from a device positioned at the reference position and configured for measuring an Angle-of-Departure (AoD) of one or more signals received from the node of the communication network.

Further, alternatively or in addition, in an exemplary embodiment, the first apparatus may be configured to obtain the information indicative of the at least one directional measurement, the directional measurement being indicative of the AoA or the AoD via a wireless and/or wired communication path, e.g. from a (e.g. positioning) server of or in communication with the communication network, to name but one non-limiting example. For example, information on signals received at the node of the communication network from the reference position and/or on signals received at the reference position from the node of the communication network may be provided to such positioning server, the positioning server being configured for performing the AoA and/or AoD estimation.

Thereby, in accordance with an exemplary embodiment, a wireless communication path may correspond to a communication path or link in a wireless communication network, in particular in a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G/NR communication network. The 2G/3G/4G/5G/NR cellular radio communication standards are developed by the 3GPP and presently available under http://www.3gpp.org/. Further, in accordance with an exemplary embodiment, a wired communication path may correspond to a communication path or link in a wired communication network employing wire-based communication technology and may correspond to a telephone network connection, a cable television connection, an internet connection, a fiber-optic connection or an electromagnetic waveguide connection.

Thus, in an exemplary embodiment, the first apparatus is part of and/or configured for communication with a system comprising at least two nodes of a communication network, the at least two nodes forming at the same time nodes of an AoA and/or AoD positioning/tracking system. According to an exemplary embodiment of the first exemplary aspect, the first apparatus is part of a location management function, LMF, located at a core network of the mobile communication network, and a location management component, LMC, located at a radio access network of the mobile communication network. For instance, such LMF and/or LMC may be part of a (e.g. positioning) server of or in communication with the communication network, to name but one non-limiting example.

According to an exemplary embodiment of the first exemplary aspect, obtaining a respective one of the at least one directional measurement is based on:
  obtaining at least one sample measurement, wherein a respective sample measurement is indicative of one or more signals that are observed with at least one antenna comprised by or connectable to the node of the communication network and/or a device positioned at the at least one reference position.

In an exemplary embodiment, the device positioned at the at least one reference position may correspond to or be comprised by a reference tag, a mobile device, an IOT device and/or an AGV device.

A respective sample measurement may for instance be a part of a set of sample measurements. A respective set of sample measurements may for example be gathered (e.g. measured) by a respective one of one or more (e.g. at least two) antennas. Thus, in case two sample measurements are gathered or obtained, in an exemplary embodiment a first one may be measured by a first antenna and a second one may be measured by a second antenna. In case the node of the communication network comprises or is connectable to more than one antenna, the respective antennas comprised by or connectable to the apparatus may gather (e.g. measure) a respective sample measurement.

Thus, one set of sample measurements may in such exemplary embodiment correspond to one antenna, respectively antenna panel, of at least two antennas, respectively antenna panels, that are comprised by (e.g. embedded in) or connectable to the node of the communication network (e.g. a further apparatus according to the second exemplary aspect). Accordingly, the other set of sample measurements of the at least two sets of sample measurements may correspond to the other antenna respectively antenna panel of the at least two antennas respectively antenna panels. It will be understood that this principle may apply accordingly in case the node of the communication network comprises or is connectable to at least one, at least two, or a plurality of antennas, respectively antenna panels, so that a corresponding plurality of sets of sample measurements is obtained or gathered.

A respective sample measurement, or a set of sample measurements, is indicative of one or more signals that are observable by at least one antenna. In an exemplary embodiment, such a (set of) sample measurement(s) is a Time-of-Arrival (TOA) measurement and/or estimation of the one or more signals that are observable. Additionally or alternatively, a respective TOA measurement and/or estimation may be determined based on, at least in part, a respective (e.g. set of) sample measurement(s).

The node of the communication network may for instance gather (e.g. measure) a respective set of sample measurements per antenna, respectively antenna panel, of the one or more, e.g. at least two, antennas, respectively antenna panels. The at least two (e.g. sets of) sample measurements may be gathered (e.g. measured) based on one or more reference signals sent from (in case of AoA) or received at (in case of AoD) the at least one reference position, e.g. by at least one second apparatus (e.g. by one or more reference tags respectively positioned at corresponding reference positions and/or by a mobile device and/or an IOT device and/or an AGV device from a corresponding reference position). Based on the one or more signals that are observable, e.g. a TOA estimation may be determined and in turn, in an exemplary embodiment, an Angle-of-Arrival may then be determined based on a Time-Difference-of-Arrival (TDOA) between at least two antennas. As mentioned, in case of a device positioned at the reference position, an AoD may be estimated e.g. based on phase differences between signals received e.g. from respective antennas of the node of the communication network.

In case of the node of the communication network, a respective antenna of the one or more, e.g. at least two, antennas may be comprised by an antenna panel. Alternatively, a respective antenna may be such an antenna panel. For example, the node of the communication network may in an exemplary embodiment be configured for Multiple Input Multiple Output (MIMO) based on at least two antennas, respectively antenna panels, wherein the respective at least two antennas may enable one of the multiple inputs and outputs. Such MIMO technology may on the one hand enable beamforming in transmission and on the other hand estimation of AoA in reception (which may thus be referred to as inverse beamforming in certain aspects). Thus, in an exemplary embodiment, the one or more, e.g. at least two, antennas may be part of such an antenna panel, or at least one antenna of the at least two antennas may be part of a first antenna panel and the at least one other antenna of the at least two antennas may be part of a second antenna panel. In the latter case, the node of the communication network comprises or is connectable to one or more, e.g. at least two, antenna panels. It is noted that in an exemplary embodiment, the at least two antennas (respectively antenna panels) are (spatially) separated by at least one pre-defined (e.g. spatial) distance, whereby the pre-defined distance may be employed for estimating a respective AoA of a signal received based on and/or being observable by the at least two antennas. Thus, in an exemplary embodiment the one or more, e.g. at least two, antennas may be comprised by a phased array of antennas or at least one antenna of the one or more, e.g. at least two, antennas may be part of a first phased array (an example of an antenna panel) and the at least one other antenna of the one or more, e.g. at least two, antennas may be part of a second phased array.

In an exemplary embodiment, the information indicative of the at least one directional measurement, indicative at least of the Angle-of-Arrival (AoA) of the signal from the reference position at the node of the communication network is obtained by the first apparatus from the node of the communication network. For example, the information indicative of the at least one directional measurement may also this embodiment be obtained by the first apparatus via said wireless and/or said wired communication path. In an exemplary embodiment, the information indicative of the at least one directional measurement indicative at least of the the Angle-of-Departure (AoD) of the signal from the node of the communication network at the reference position may be obtained by the first apparatus from a device positioned at the reference position (e.g. from a reference tag, mobile device, AGV and/or IOT device) and/or from said positioning server via a wireless and/or a wired network connection.

As opposed for example to positioning and/or tracking methods based on optical signals, e.g. employing cameras, positioning and/or tracking methods based on RF signals may be prone to error as a result of multipath and/or NLOS signal propagation, which in particular in case of signal calibration, may lead to errors in determined orientations and/or positions of respective nodes. Addressing in particular such potentially adverse effects of multipath and/or NLOS signal propagation, the method according to the first aspect employs in particular the angular weighting function for the at least one reference position for obtaining a weighted estimate of the representative direction. In addition, in an exemplary embodiment, an additional determination may be employed for example to already exclude directional measurements that may result from multipath and/or NLOS signal propagation.

Thus, according to an exemplary embodiment of the first exemplary aspect, the method further comprises:
 obtaining, for the at least one reference position, information indicative of at least one (e.g. two) directional measurement, wherein a respective directional measurement is indicative at least of a propagation direction of a signal communicated between the at least one reference position and the node of the communication network;
 determining whether the at least one directional measurement is a Line-of-Sight, LOS, measurement or a Non-Line-of-Sight, NLOS, measurement;
 obtaining, the estimate of the representative direction for the at least one reference position based on at least one directional measurement s, if the at least one directional measurement is determined to be a LOS measurement.

For example, more than one (e.g. at least two) directional measurement may be obtained for a respective reference position. In particular in case of indoor positioning/tracking, one or more of the obtained directional measurements may inhibit large errors, such that correspondingly estimated AoA (or AoD) may be referred to as "ghost angles" and may correspond e.g. to one or more reflections of a signal from a reference position. Obtaining more than one directional measurement and estimating the representative direction for the at least one reference position based on a directional measurement, if the at least one directional measurement is determined to be a LOS measurement, i.e. not a NLOS measurement, may thus help to prevent corresponding errors and may enable an estimation of a representative direction of increased reliability. Thereby, directional measurements determined to be NLOS measurements may be discarded, ignored and/or not used.

In other words, according to an exemplary embodiment of the first exemplary aspect, the method further comprises
 obtaining, the estimate of the representative direction for the at least one reference position not based on at least one directional measurement, if the at least one directional measurement is determined to be a NLOS measurement.

It turned out that LOS measurements arriving at the at least one node of the communication network from a same reference position are associated with a better signal quality than NLOS measurements and/or multipath measurements/reflections. Thus, in an exemplary embodiment, determination of whether a directional measurement is a NLOS or a LOS measurement may be based on a signal quality associated with a corresponding directional measurement.

According to an exemplary embodiment of the first exemplary aspect, the method further comprises:
 obtaining, for the at least one reference position, information at least on signal quality measurements, wherein a respective signal quality measurement is associated with a respective directional measurement and is indicative of a signal quality for the at least one reference position,
 determining whether a signal quality measurement associated with a respective directional measurement is above or equal to a predefined signal quality threshold; and
 obtaining, for the at least one reference position, the estimate of the representative direction from the node of the communication network to the at least one reference position based on the at least one directional measurement if the signal quality measurement associated with the at least one directional measurement is determined to be equal to or above the predefined signal quality threshold.

Thereby, a signal quality measurement associated with a respective directional measurement is to be understood as signal quality of a signal communicated between the at least one reference position and the node of the communication network. In an exemplary embodiment, a signal quality is represented by and/or corresponds to at least one of a Signal-to-noise ratio (SNR), a signal-to-interference-plus-noise ratio (SINR) and a Received Signal Strength Indication (RSSI).

In case more than one directional measurement is obtained for a same reference position, the directional measurements may be combined to provide the representative direction from the node of the communication network to the reference position using in an exemplary embodiment a weighted average.

Thus, according to an exemplary embodiment of the first exemplary aspect, obtaining, for the at least one reference position, the estimate of the representative direction comprises:
 obtaining at least one weighted directional measurement by applying a respective weighting function to a corresponding one directional measurement,
 obtaining the estimate of the representative direction based on the at least one weighted directional measurement, wherein the weighting function is based on at least one of a median weight derived based on the at least one selected direction measurement and an angular weighting function.

Thereby, the median weight can be employed equally weighting respective directional measurements of the at least one directional measurement. Alternatively, an angular weighting function may be employed individually weighting respective directional measurements depending on corresponding AoAs (or AoDs) at the node of the communication network, e.g. based on an aperture of at least one antenna of the node of the communication network and/or based on an aperture of at least one antenna comprised by or connected to a device employed for transmitting a signal to the node of the communication network, e.g. said reference tag, said mobile device, said IOT device and/or said AGV device. By applying the weighting function to individual directional measurements, in particular adverse effects of NLOS propagation and/or multipath propagation may be mitigated in particular in case the weighing function is employed based on a respective aperture of the node of the communication network and/or of a device transmitting a signal at the reference position.

In addition, LOS measurements arriving at the node of the communication network from a same reference position or departing from the node of the communication network to a same reference position, were found to often have a higher signal quality, e.g. a larger RSSI, than NLOS and/or multipath measurements. Taking account of this effect, in an exemplary embodiment, directional measurements are discarded in case an associated signal quality is below a predefined threshold.

In other words, according to an exemplary embodiment of the first exemplary aspect, the method further comprises:
selecting at least one directional measurements if for a respective one of the at least two selected directional measurements, a signal quality measurement associated with the respective directional measurement is above or equal to a predefined signal quality threshold; and
applying the weighting function to the at least two selected directional measurements.

Appropriately selecting one or more reference positions for determining an orientation and/or a position of one or more nodes of a communication network may contribute to an improvement of a system calibration result. It turned out that taking account of at least one of three criteria may in particular support achievement of accurate system calibration results.

According to a first criterion, reference positions may be selected in directions from the at least one node of the communication network along which correspond to an aperture of at least one antenna (e.g. of an antenna array) of the at least one node of the communication network, e.g. where an antenna array of the node of the communication network performs well and/or shows a sensitivity above a predefined threshold.

According to a second criterion, reference positions may be selected such that a signal quality at the node of the communication network from the reference position is satisfactory, e.g. is above a predefined threshold. For example, reference positions may be selected near the node of the communication network as such signals from such positions may be less likely to be affected by multipath and/or NLOS signal propagation. Signals from such positions may thus show a larger signal quality, e.g. SNR, SINR or RSSI as compared to positions farther away from the node of the communication network.

According to a third criterion, reference positions may be selected to be as widely spread apart as possible within an aperture of at least one antenna (e.g. an antenna array) of the node of the communication network. Thereby, it may be desirable to avoid for example selection of co-linear and/or co-planar reference positions as seen from the at least one node of the communication network as signals from such reference positions may cause ambiguities when estimating a pose of the node of the communication network.

In an exemplary embodiment, the calibration method according to the exemplary first aspect may enable evaluation if the at least one reference position has been selected satisfactory and is thus a reliable reference position based on a quality metric defined based on at least one of the three criteria.

According to an exemplary embodiment of the first exemplary aspect, the method further comprises:
determining whether or not the at least one reference position is reliable based on a quality metric determined based on at least one of the estimate of the representative direction obtained for the at least one reference position and a signal quality for the at least one reference position;
discarding the at least one reference position if the at least one reference position is determined to be not reliable.

Thereby, based on the estimate of the representative direction obtained for the at least one reference position the first criterion may be verified by relating the estimated representative direction to the aperture of the node of the communication network. At the same time, the estimate of the representative direction obtained for the at least one reference position may further enable verifying the third criterion by mutually relating estimates of different representative directions obtained for different reference positions and by thus determining e.g. co-linear and/or co-planar geometries. Further, the signal quality for the at least one reference position may enable verifying the second criterion. Thus defining a quality metric may enable verifying reliability of one or more reference positions used for calibrating a positioning/tracking system.

In an exemplary embodiment, information on an orientation and/or position of the node of the communication network is obtained based on at least two (at least four) representative directions corresponding to directions from the node of the communication network to at least two (at least four) respective reference positions. In other words, according to an exemplary embodiment of the first exemplary aspect, the method further comprises:
obtaining, for at least two reference positions, respective estimates of a corresponding representative direction from a node of a communication network to a respective one of the at least two reference positions based on information indicative of at least one respective directional measurement for a corresponding reference position, the directional measurement being indicative at least of a propagation direction of a signal from the respective one of the at least two reference positions to the node of the communication network;
obtaining, for a respective one of the at least two reference positions, a corresponding weighted estimate of the corresponding representative direction based on at least an angular weighting function for the respective one of at least two reference positions, the angular weighting function being representative at least of an aperture of at least one antenna of the node of the communication network; and obtaining information indicative at least of an orientation and/or position of the node of the communication network at least based on the weighted estimates of the representative directions obtained for the at least two reference positions.

While it turned out that based on at least four reference positions, an orientation and/or a position of a node of a communication network may be obtained reliably, respective reference positions may be used for estimating an orientation and/or a position of more than one node of the communication network.

Thus, in other words, according to an exemplary embodiment of the first exemplary aspect, the method further comprises:

obtaining, for a same reference position of the at least one reference position, a respective estimate of a respective representative direction from at least two nodes of a communication network to the same reference position based on at least one directional measurement indicative at least of a propagation direction of a signal communicated between the same reference position and a respective one of the at least two nodes of the communication network.

In an exemplary embodiment, the second apparatus corresponds to or is comprised by a device positioned at the at least one reference position. The device may be a stationary device positioned at a respective reference position or may be a movable device capable of being employed at multiple reference positions. For example, in an exemplary embodiment, the second apparatus corresponds to or is comprised by a reference tag (an example of a stationary device), a mobile device, an IOT device and/or an AVG device (examples of moveable devices). Thereby, in an exemplary embodiment, a mobile device may be or correspond to a smartphone, a tablet computer, a notebook computer, a smart watch, and a smart band.

Thus, for example a reference tag may be configured to transmit a signal from a corresponding reference position to be received at the node of the communication network based on which the node of the communication network may measure an AoA of the signal for the first apparatus to obtain a corresponding directional measurement from the node of the communication network. Alternatively or in addition, a reference tag may be configured to receive a signal at a corresponding reference position from the node of the communication network based on which the reference tag may measure an AoD of the signal and to provide the measured AoD to the first apparatus to obtain a corresponding directional measurement. Thereby, the reference tag (an example of a device being positioned at or being moveable to the at least one reference position) is configured to provide information for causing the first apparatus to perform the method according to the first exemplary aspect.

According to an exemplary embodiment of the second exemplary aspect, the information for causing the first apparatus to perform comprises or corresponds to at least one of position information of the reference position, position information of the second apparatus, identification information of the second apparatus, at least one reference signal for enabling determination of a signal quality.

For example, the information may comprise position information of the reference position and/or of the second apparatus such that the node of the communication network may measure the AoA and/or AoD based on a signal used for transmitting the information and may be provided at the same time with position information of the reference position and/or corresponding position information of the second apparatus at the reference position. Provision of identification of the second apparatus, e.g. of a reference tag, may be sufficient in case such identification information is related to corresponding position information of the reference position and/or of the second apparatus at the reference position. Such relation may be provided if the identification is related to position information e.g. in a table stored and/or held available at the node of the communication network, at the first apparatus and/or at a storage medium comprised by or connected to the node of the communication network and/or the first apparatus.

According to an exemplary embodiment of the second exemplary aspect, providing the information for causing the first apparatus to perform comprises:

transmitting or causing of transmitting the information for causing the first apparatus to perform based on a signal reflecting a single antenna transmission characteristic.

In particular in case of a reference tag comprising—a single antenna for signal transmission, a corresponding signal observable at the node of the communication network does not by itself include any directional information and an angle of arrival is to be estimated at the node of the communication network, e.g. based on at least two antennas comprised by or connected to the node of the communication network as described further herein.

It is noted that in addition to a device positioned at or moveable to a respective reference position, in addition or alternatively, in an exemplary embodiment the second apparatus may comprise or correspond to the node of the communication network. For example, by providing the at least one directional measurement, the node of the communication network may be configured for causing the first apparatus to perform the method according to the first exemplary aspect.

Thus, according to an exemplary embodiment of the second exemplary aspect, the second apparatus is or is part of a mobile device, an automated guided vehicle, AGV, an Internet-of-Things, IoT device, or the node of the communication network.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
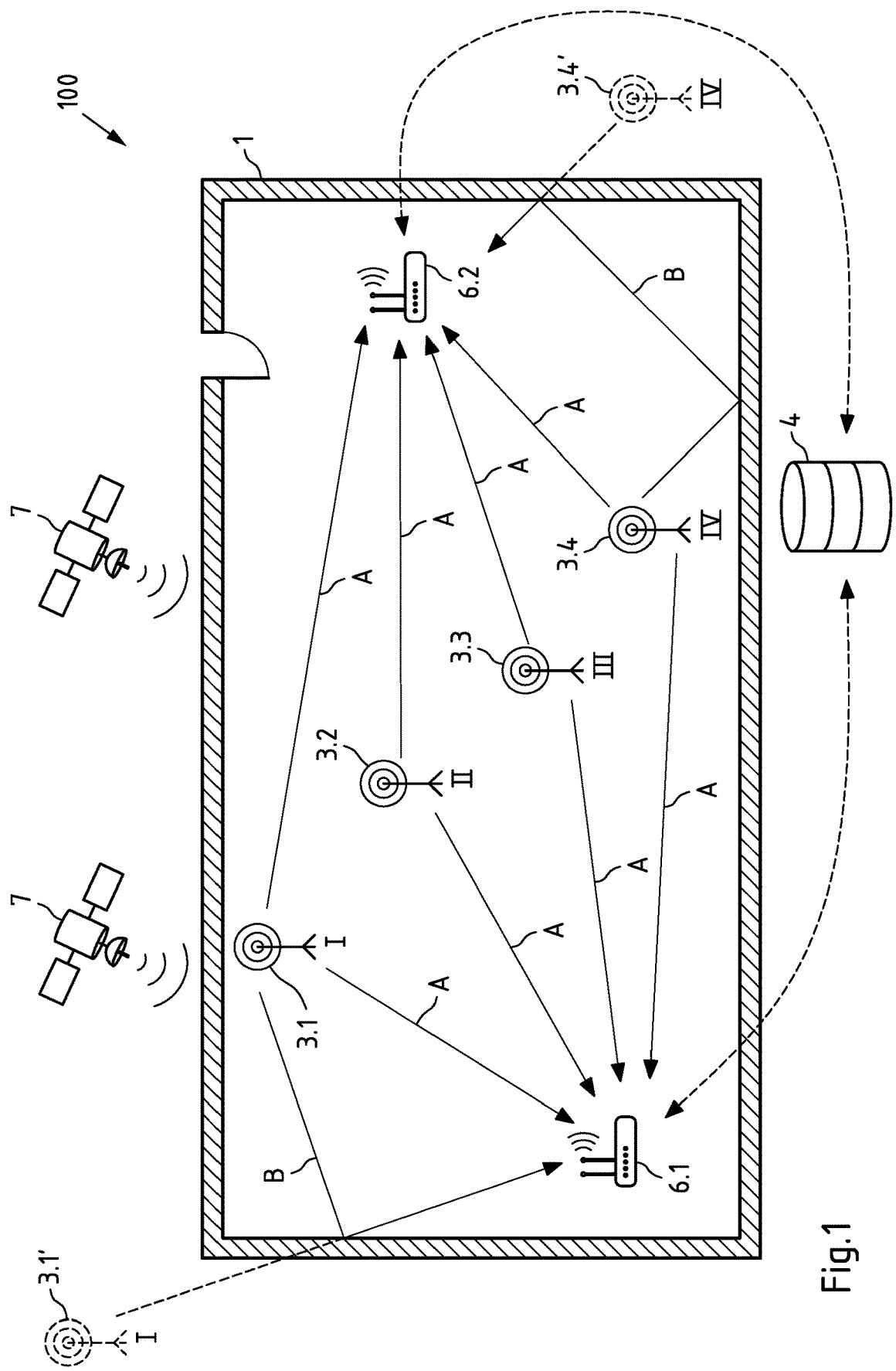
FIG. 1 a schematic block diagram of a system according to an exemplary aspect.

FIG. 1 is an example of a schematic high-level block diagram of a system 100 that is configured to perform and/or control the method according to the first exemplary aspect. It is noted that while exemplary embodiments illustrated in the following may exemplarily use Angle-of-Arrival (AoA), the concepts are applicable in analogy to Angle-of-Departure (AoD).

The system 100 comprises a positioning server 4 which may enable or comprise an LMF and/or an LMC of a communication network. The positioning server 4 may be connectable to or comprise a database, e.g. for storing and retrieving information, such as information indicative at least of an orientation and/or position of the node of the communication network (which may be referred to as pose information further herein), one or more estimates of representative directions for one or more corresponding reference positions, one or more weighted estimates of representative directions for one or more corresponding reference positions, sample measurements, orientation information, or the like, to name but a few non-limiting examples.

The system 100 further comprises a plurality of reference antennas 3.1 to 3.4 respectively located at corresponding reference positions I to IV within a premise 1. For example, premise 1 may correspond to a warehouse where system 100 may support positioning and/or tracking of goods and/or of devices such as IOT and/or AGV devices (e.g. robot devices) handling goods and/or equipment. Premise 1 may correspond to a different, e.g. industrial environment where system 100 may support positioning and/or tracking of industrial IOT and/or AGV devices and/or different equipment. While system 100 is suitable for such applications, system 100 may be employed similarly more general in buildings, shopping malls, office complexes, and/or publicly accessible locations (e.g. stations, airports, university buildings or the like) to support locating and/or tracking of users and/or devices, e.g. mobile devices of users. While system 100 may in particular be suitable for indoor positioning and/or tracking, system 100 may at least in part be employed in at least partially outside areas for positioning and/or tracking of devices such as IOT and/or AGV and/or mobile devices. It is noted that examples of mobile devices comprise in particular smartphones, a tablet computers, notebook computers, smart watches, and smart bands.

Reference antennas 3.1 to 3.4 may respectively correspond to corresponding antennas comprised by or connected to corresponding reference tags (not shown). Alternatively or in addition, a respective one of antennas 3.1 to 3.4 may represent one or more antennas (e.g. a single antenna and/or an antenna array) comprised by or connected to a mobile device, an IOT device and/or an AGV device as further examples of the second apparatus. A respective one of antennas 3.1 to 3.4 may be positioned at least during a time period of performing the method according to the first, second and/or third exemplary aspect at a corresponding one of reference positions I to IV. Alternatively or in addition, antennas 3.1 to 3.4 may be representative of a single antenna or a single antenna array comprised by or connected to an AGV device, e.g. a robot device configured for self-localization, that moves between reference positions I to IV at least during a time period of performing the method according to the first, second and/or third exemplary aspect.

FIG. 1 shows satellites 7, which may be part of or in communication with a GNSS positioning system, e.g. of a GPS or GALILEO positioning system. For example, while different methods may be employed for localizing reference positions I to IV, for example a robot device moving between reference positions I to IV may be configured for self-localization at least in part based on signals from satellites 7 observable at a respective one of reference positions I to IV. It is noted that different methods for self-localization may be employable, e.g. in case signals from satellites 7 are not observable within premise 1.

Reference antennas 3.1 to 3.4 may provide signals observable by a respective one of nodes 6.1, 6.2 of a communication network comprised by system 100. For example, FIG. 1 shows arrows A which schematically illustrate respective exemplary Line-of-Sight (LOS) signals that may propagate along respective direct paths from a respective one of antennas 3.1 to 3.4 to a corresponding one of nodes 6.1, 6.2. FIG. 1 further exemplarily shows two arrows B, which schematically illustrate respective exemplary Non-Line-of-Sight (NLOS) signals that may propagate along respective indirect paths, in the exemplary cases from antenna 3.1 to node 6.1 or from antenna 3.4 to node 6.2 undergoing one or more reflections e.g. at corresponding walls of premise 1. As exemplary illustrated in FIG. 1, such NLOS signals may cause arrival of "ghost" signals B at nodes 6.1, 6.2 that may appear at a corresponding one of nodes 6.1, 6.2 as being observed from a "ghost" antenna 3.1', 3.4', respectively. It is noted that while FIG. 1 may show a specific number of NLOS signals B and a specific number of LOS signals A, for example, further reflections at respective walls of premise 1 may cause presence of further and/or different NLOS signals that may originate from a respective one of antennas 3.1 to 3.4 and that may be observable at a respective one of nodes 6.1, 6.2. Further, different, alternative and/or additional LOS signals from a respective one of antennas 3.1 to 3.4 may be observable at a respective one of nodes 6.1, 6.2.

Nodes 6.1, 6.2 may be respective Wireless Local Area Network, WLAN, access points, and/or respective Bluetooth access points and/or respective access points of a cellular communications network. WLAN is for example specified by the standards of the IEEE 802.11 family (http://www.ieee.org/). A cellular communications network may for example be a mobile phone network like a 2G/3G/4G/5G/New Radio (NR) and/or future cellular communication network. The 2G/3G/4G/5G/NR cellular radio communication standards are developed by the 3GPP and presently available under http://www.3gpp.org/. While FIG. 1 specifically shows two nodes 6.1 and 6.2, system 100 may comprise only one or more than two nodes, respectively of one or more communication networks.

While a respective one of nodes 6.1, 6.2 of one or more respective communication networks may on the one hand be configured to provide access for a user to the respective communication network, e.g. may provide access to the Internet via a WLAN connection and/or may provide access to a communication network such as a cellular communication network for performing voice and/or video phone calls, the respective one of nodes 6.1, 6.2 is part of system 100 and is thus configured for supporting positioning and/or tracking of a device such as a mobile device, an IOT device and/or an AGV device at least within area/premise 1. In the following, nodes 6.1, 6.2 will therefore be referred to as respective locators 6.1, 6.2.

A respective one of locators 6.1, 6.2 comprises at least two antennas e.g. that are a part of phased antenna array (not shown). As indicated by dashed arrows in FIG. 1, a respective one of locators 6.1, 6.2 is located in the area of premise 1, in which signals of the reference antennas 3.1 to 3.4 are observable, e.g. for determining orientation and/or position information indicative of an orientation and/or position of the at least two antennas (of the phased antenna array), respectively of the respective one of locators 6.1, 6.2 in relation to a reference direction, which may be defined based on premise 1 and/or based on a map such as an indoor map of premise 1 and/or based on reference directions such as north/south directions. As further illustrated by dashed arrows in FIG. 1, a respective one of locators 6.1, 6.2 is configured for communicating with positioning server 4 via a wired and/or a wireless communication path. Thereby, as mentioned further herein, a wireless communication path may correspond to a communication path or link in a wireless communication network, in particular in a WLAN or a cellular network. Further, a wired communication path may correspond to a communication path or link in a wired communication network employing wire-based communication technology and may correspond to a telephone network connection, a cable television connection, an internet connection, a fiber-optic connection or an electromagnetic waveguide connection.

Example embodiments enabling a method according to the first, second and/or third exemplary aspect may utilize the architecture shown by the system 100 of FIG. 1. In this way, a low-latency, low-overhead method for determining orientation and/or position information of a locator of a positioning/tracking system is achieved. The orientation and/or position information may be determined at the network-side, e.g. LMF and/or LMC.

Figure 2:
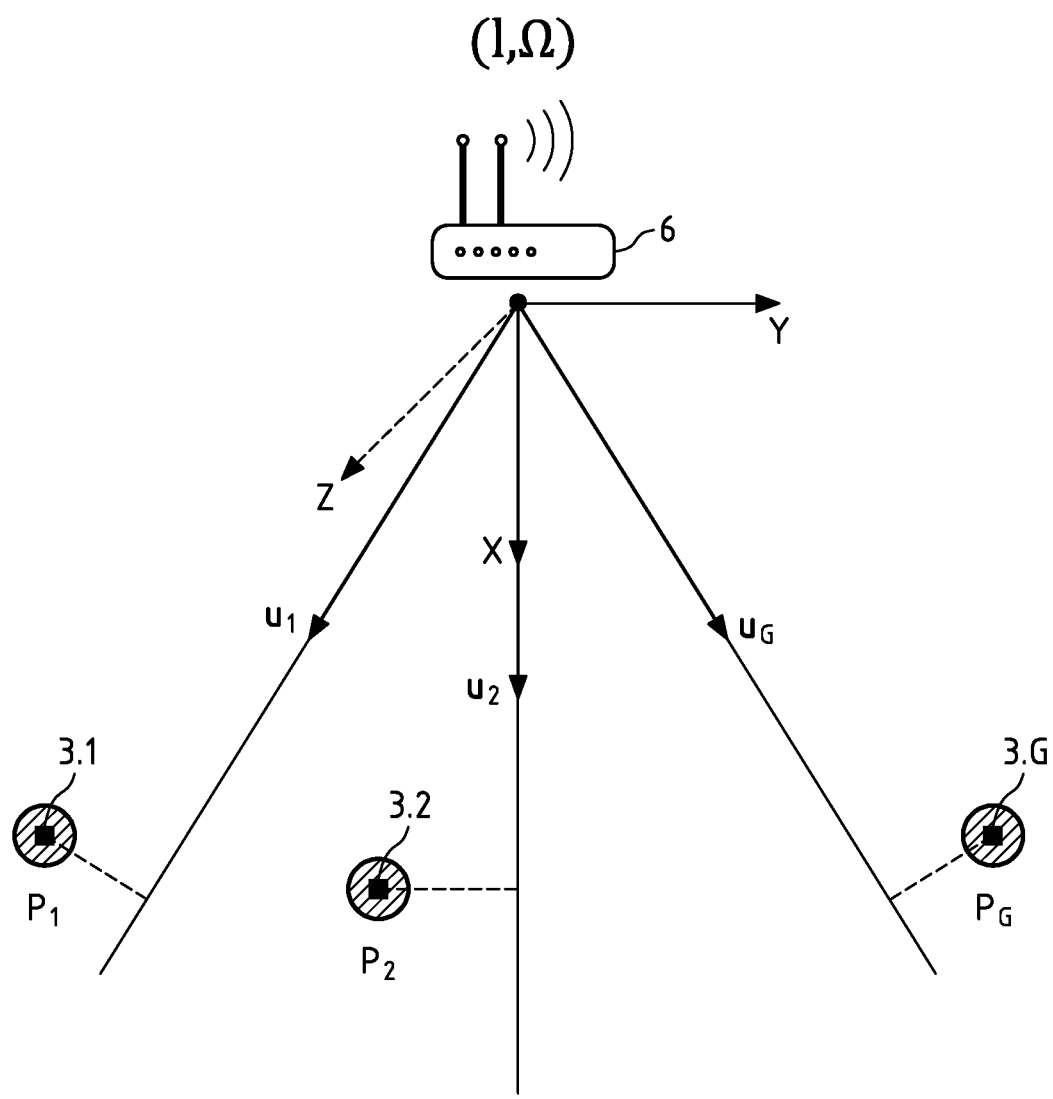
FIG. 2 a respective illustration of a respective AoA and/or AoD estimation at a node of a communication network of FIG. 1.
Figure 3:
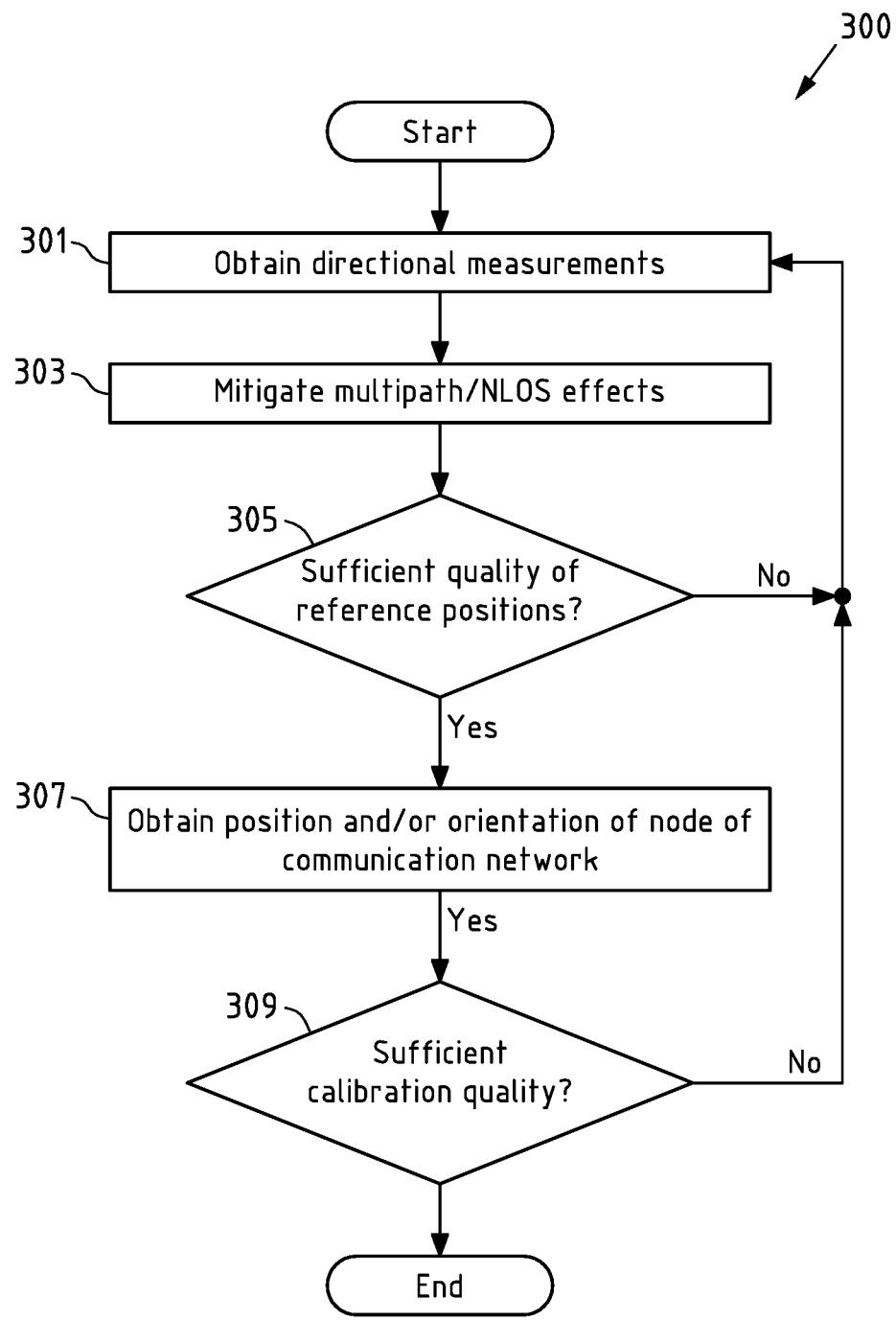
FIG. 3 a flowchart showing an example embodiment of a method according to an exemplary aspect.

FIG. 2 is a respective illustration of a respective AoA or AoD estimation at a node of a communication network of FIG. 1 and FIG. 3 is a flowchart showing an example embodiment of a method according to an exemplary aspect. In the following, a method according to an exemplary aspect is described with reference to FIGS. 2 and 3.

FIG. 2 exemplarily illustrates locator 6, which may correspond to any one of locators 6.1 and 6.2 of FIG. 1. Thereby, l represents the unknown 3D position of locator 6 in a map reference frame and may be represented by a 3×1 column vector. Further, Ω represents the unknown 3D orientation of locator 6 in the same reference frame and may be represented by a 3×3 orthogonal matrix whose columns are perpendicular unit vectors representing the local axes of locator 6 in a reference system of the locator schematically and exemplarily represented by Cartesian x, y, z coordinate system shown in FIG. 2. Reference antennas 3.1 to 3.G are located at respective reference positions $p_1$ to $p_G$, which may correspond to reference antennas 3.1 to 3.4 of FIG. 1. Thereby, a respective one of the reference positions may be represented by a corresponding 3×1 column vectors and a respective one (the $g^{th}$) of the G reference positions may then be represented as $$p_g = l + \Omega r_g, g=1,\ldots,G,$$

where $r_g$ is a 3D position vector that may be representative of the reference position $p_g$ expressed in a reference frame of locator 6. While for a given reference position, the vector $r_g$ may not be known exactly, an estimate $\hat{u}_g$ of its direction, which may be represented by a corresponding unit vector $u_g = r_g/\|r_g\|$ ($\|\ldots\|$ denoting a magnitude, absolute value or length of a corresponding vector) in the reference frame of the locator may be known. Thereby an estimate for $\|r_g\|$ may be unavailable. FIG. 2 exemplarily illustrates in the Cartesian x, y, z coordinate system representing the reference system of locator 6 respective x, y and z components $\alpha_x$, $\alpha_y$ and $\alpha_z$ of the Angle-of-Arrival (AoA) $\alpha$ of a signal arriving at locator 6 along a direction represented by unit vector $u_g$.

Methods according to the first, the second and the third exemplary aspects may enable estimation of at least an orientation of locator 6, in particular of the pose (position and orientation) of locator 6, whereby the pose of locator 6 may be represented by the position/orientation pair (l, Ω) based on reference positions $p_1$ to $p_G$ and/or based on corresponding estimated directions $\hat{u}_1$ to $\hat{u}_G$ expressed in the frame of locator 6.

As disclosed further herein, in preparation of a calibration of system 100, e.g. by determining at least a 3D orientation and/or position of a respective one of locators 6.1, 6.2, in particular by determining a 3D pose of a respective one of locators 6.1, 6.2, reference positions may be selected in particular based on three selection criteria.

In an exemplary embodiment, according to a first criterion, reference positions may be selected in directions where for example an antenna and/or an antenna array of a locator performs well, whereby a performance of an antenna and/or an antenna array in a given direction $u_g$ (expressed in the reference frame of the locator) to reference position $p_g$ may be related to a corresponding antenna aperture $a(u_g)$, as seen along said direction. It is noted that $a(u_g)$ is also referred to as angular weighting function further herein. It may be desirable to select reference positions where a corresponding antenna aperture is sufficient, e.g. above a predetermined threshold. For example, for a planar antenna a reference point may be selected in front of the antenna.

In an exemplary embodiment, according to a second criterion, reference positions may be selected such that a signal quality of a signal from a respective reference position at locator 6 is sufficient, e.g. above a predefined threshold. Thereby, it may be possible to ensure that a sufficient number of reference positions are selected e.g. in line-of-sight and/or within an operation range of the locator. In an exemplary embodiment, at least four reference positions are selected per locator. At the same time, a respective reference position may be employed for orientation and/or position determination of more than one locator. In other words, a number of reference positions may be smaller than a number of locators. Selecting reference positions in proximity to a locator (e.g. at a distance smaller than a predefined threshold distance) may enable reducing a probability that signals from corresponding reference positions are adversely affected by multipath and/or NLOS signal propagation. It turned out that signal quality measures, e.g. a Single-to-noise ratio (SNR), a signal-to-interference-plus-noise ratio (SINR), and/or a Received Signal Strength Indication (RSSI) may suitably represent the second criterion.

In an exemplary embodiment, according to a third criterion, reference positions may be selected to be as spread apart within an angular range corresponding to the aperture of the antenna or the antenna array of the locator. A selection respecting the third criterion may enable avoiding, at least in part, undesirable geometrical arrangements of reference positions such as co-linear and/or co-planar arrangements.

Referring to FIG. 3, FIG. 3 is a flowchart 300 showing an example embodiment of a method according to the first exemplary aspect of the present invention. This flowchart 300 may for instance be performed by a LMF and/or LMC e.g. of a positioning server 4 of FIG. 1 and may represent a calibration method for calibrating orientation and/or position of a respective one of locators 6.1, 6.2 of system 100 of FIG. 1.

In the shown first step 301, one or more directional measurements are obtained, e.g. at positioning server 4 (an example of a first apparatus), e.g. based on AoA measurements performed at a respective one of locators 6.1, 6.2 of system 100 of FIG. 1 based on a signal from a respective one of reference antennas 3.1 to 3.G, e.g. reference antennas 3.1 to 3.4 of FIG. 1. While exemplarily referring to AoA measurements performed at a respective one of locators 6.1, 6.2 of system 100 of FIG. 1, it is noted that in an alternative or additional exemplary embodiment, one or more directional measurements may be obtained in step 301 based on AoD measurements performed at a respective device positioned at a respective one of of reference positions I to IV in FIG. 1 and may e.g. be received by a respective one of locators 6.1, 6.2 of system 100 of FIG. 1 from the device and/or from positioning server 4 of FIG. 1.

For example, for a respective one of reference antennas 3.1 to 3.G (which is to be understood as for a respective one of reference positions $p_1$ to $p_G$), M directional measurements $\hat{u}_g^m$ may be obtained, in an exemplary embodiment in combination with, e.g. to be associated with (e.g. obtained and/or stored in association), corresponding signal quality measurements $RSSI_g^m$ representative of a signal quality of a respective signal based on which the AoA measurement is performed at the respective locator.

In the shown second step 303, adverse effects of multipath and/or NLOS signal propagation are addressed to be mitigated. Thus, a method according to the first, the second, and/or the third exemplary aspect may enable mitigation of multipath and/or NLOS propagation, whereby the methods may in particular take account of indoor propagation conditions in particular of RF signals (as employed e.g. by WLAN, Bluetooth and/or 5G communication networks) e.g. by discarding signals stemming from signals received along NLOS angles ("ghost angles") e.g. corresponding to reflections, or their combined effect, rather than the actual direction to the reference position). To this end, a representative direction is estimated for a respective pair of locator and reference position based on at least one and/or a plurality of directional measurements obtained for this pair. A weighted estimate is obtained of a representative direction estimated for a respective pair by applying at least an angular weighting function to the respective representative direction. Thereby, in particular the angular weighting function may be provided to take into account a respective probability that a corresponding representative direction may be obtained based on a direct LOS or based on a NLOS and/or multipath signal.

For example, for at least one reference position $p_g$, an estimate of a representative direction $u_g$ from locator 6 (an example of a node of a communication network) to the at least one reference position $p_g$ is obtained based on at least one directional measurement $\hat{u}_g^m$, e.g. data representative of the at least one directional measurements $\hat{u}_g^m$ obtained at positioning server 4 from locator 6 (an example of information indicative of at least one directional measurement). Thereby, $\hat{u}_g^m$ may represent the m-th directional measurement out of M measurements obtained at locator 6 (e.g. estimated by locator 6) from reference position $p_g$. The directional measurement $\hat{u}_g^m$ may in an exemplary embodiment be obtained in combination with (in association with) a respective signal quality measurement $RSSI_g^m$.

For example, an estimate $\hat{u}_g$ of representative direction $u_g$ may be obtained for reference position $p_g$ based on m=1, . . . , M directional measurements $\hat{u}_g^m$:

$$\hat{u}_g = f_1(\hat{u}_g^1, \ldots, \hat{u}_g^M), g=1, \ldots, G.$$

Thereby, for a set of directional measurements $\hat{u}_g^1, \ldots, \hat{u}_g^M$, individual measurements may be more or less affected by NLOS and/or multipath propagation. Thereby, LOS measurements obtained at locator 6 from a same reference position $p_g$ have been found to have a better RSSI as compared to measurements affected by NLOS and/or multipath propagation.

Thus, in an exemplary embodiment, the first apparatus may be configured to determine whether a signal quality measurement associated with a respective directional measurement is above or equal to a predefined signal quality threshold. The first apparatus may in this exemplary embodiment be configured to obtain, for the at least one reference position $p_g$, the estimate of the representative direction from locator 6 to reference position $p_g$ based on at least one directional measurement of at least two directional measurements if the signal quality measurement associated with the at least one directional measurement is determined to be equal to or above the predefined signal quality threshold. In other words, directional measurements with an associated $RSSI_g^m$ below the predetermined threshold may be discarded.

Directional measurements for reference position $p_g$ with an associated RSSI equal to or above the predefined threshold may then be combined to yield a single representative direction for locator 6 to reference position $p_g$. These directional estimates may be combined by using, for example, a weighted average estimator whose weights are provided by an angular estimation algorithm. Alternatively, e.g. if no angular information is available, a median estimator may be used. In an exemplary embodiment, the obtained estimate of the representative direction may then be normalized to yield unit vector $\hat{u}_g$.

Thus, in an exemplary embodiment, the first apparatus may be configured for
  obtaining at least one weighted directional measurement $\hat{u}_g^m$ by applying a respective weighting function to a corresponding directional measurements $\hat{u}_g^m$,
  obtaining the estimate of the representative direction based on the one weighted directional measurements $\hat{u}_g^m$,
  wherein the weighting function is based on at least one of a median weight derived based on the at least one selected direction measurements and an angular weighting function.

For example, at least two weighted directional measurements $\hat{u}_g^m$ may be obtained by applying a respective weighting function to a corresponding one of the at least two directional measurements $\hat{u}_g^m$. In such exemplary embodiment, the estimate of the representative direction may be obtained by combining the at least two weighted directional measurements $\hat{u}_g^m$. In particular in this embodiment, the weighting function is based on at least one of a median weight derived based on the at least two selected direction measurements and an angular weighting function.

In the exemplary embodiment, the first apparatus may further be configured for, e.g. before applying the weighting function:

selecting at least two directional measurements $\hat{u}_g^m$ if for a respective one of the at least two directional measurements $\hat{u}_g^m$, a signal quality measurement $RSSI_g^m$ associated with the respective directional measurement $\hat{u}_g^m$ is above or equal to a predefined signal quality threshold; and applying a respective weighting function to a respective selected directional measurements.

In other words, said function $f_1(\hat{u}_g^1, \ldots, \hat{u}_g^M)$ may in an exemplary embodiment correspond to a combination of a threshold comparison and an application of said weighting function.

Signal quality values, e.g. RSSI values obtained in an exemplary embodiment in combination with directional measurement $\hat{u}_g^m$ may in an exemplary embodiment be combined in a similar manner as the corresponding directional measurements $\hat{u}_g^m$, e.g. by similarly applying a threshold comparison and a corresponding weighting function:

$$RSSI_g = f_2(RSSI_g^1, \ldots, RSSI_g^M), g=1, \ldots, G.$$

It is noted that in the above disclosure, RSSI is used as an exemplary, illustrative example while different suitable signal quality metrics may be applicable alternatively or in addition, e.g. SNR and/or SINR. Further, it is noted that in an exemplary embodiment, a same function may be applied to the directional measurements and the signal quality, i.e. $f_1 = f_2$.

Further, still referring to step 303 of FIG. 3, the estimate $\hat{u}_g$ of the representative direction $u_g$ from locator 6 to reference position $p_g$ is additionally weighted employing an additional reliability weight $w_g$ to yield a weighted estimate of the representative direction. Said additional reliability weight $w_g$ is in an exemplary embodiment in particular based on the observation that multipath reflections may exhibit lower power as compared to line-of-sight components. In addition, line of sight components may be located rather a coverage of locator 6 (e.g. inside of an angular range corresponding to an antenna aperture of the locator), whereas multipath components tend to come from the sides:

$$w_g = f_3(RSSI_g a(\hat{u}_g)), g=1, \ldots, G.$$

Thus, the additional reliability weight $w_g$ comprises at least the angular weighting function $a(\hat{u}_g)$ and the first apparatus is configured for obtaining, for the at least one reference position $p_g$, a weighted estimate of the representative direction $\hat{u}_g$ based on at least an angular weighting function $a(\hat{u}_g)$ for the at least one reference position $p_g$, the angular weighting function $a(\hat{u}_g)$ being representative at least of an aperture of at least one antenna of the locator (the node of the communication network).

It is noted that at least some input values of the function $f_3$ may be known in advance. For example, the estimated representative directions at locator 6 $\hat{u}_1 \ldots \hat{u}_G$ may enable weighing of the directional measurements according to an antenna aperture of locator 6 along those directions to yield $a(\hat{u}_1) \ldots a(\hat{u}_G)$, e.g. respective examples of weighted estimates of corresponding representative directions. Further, measured received signal quality values, e.g. signal strength indicators, corresponding to the estimated directions $RSSI_1 \ldots RSSI_G$ may further contribute to the weighting (may in an exemplary embodiment be employed in addition or in combination to the angular weighting function). For example, the weighting may be (but not limited to) linear with respect to one or more input variables. Zero weights may lead to discarded measurements, for example, if RSSI falls below a threshold, if antenna does not perform sufficiently well in those directions.

Referring back to FIG. 3, in an exemplary step 305, the first apparatus may in an exemplary embodiment determine if sufficient calibration quality is provided by the employed one or more reference points. In other words, in an exemplary embodiment, the first apparatus may be configured for determining whether or not the at least one reference position is reliable based on a quality metric determined based on at least one of the estimate of the representative direction obtained for the at least one reference position and a signal quality for the at least one reference position;

discarding the at least one reference position if the at least one reference position is determined to be not reliable.

For example, in step 305, positioning server 4 may determine whether reference positions have been suitably selected e.g. based on the first, the second and/or the third criteria disclosed further herein. To this end, in an exemplary embodiment, a quality metric may be provided, e.g. a combined quality metric that may reflect any respective one or to all of the first, the second and the third criteria. In an exemplary embodiment, the corresponding quality metric may either be binary and may thus be designed to determine a respective reference point to be satisfactory or unsatisfactory and that may, being applied to a group of reference positions determine the group of reference positions to be satisfactory or unsatisfactory. In an exemplary embodiment, the quality metric may be gradual, e.g. may take continuous values that may be compared with a predefined threshold to determine whether or not a reference point is satisfactory or unsatisfactory and that may, being applied to a group of reference points, determine whether or not said group of reference points is satisfactory or unsatisfactory. For example, a quality metric QM may be represented as:

$$QM = f_4(p_1 \text{ to } p_G; w_1 \ldots w_G)$$

The reference positions $p_1$ to $p_G$ in advance to performing the calibration method may thus enable detection of unsatisfactory geometries (e.g. of co-linear and/or co-planar arrangements of reference positions). Further based on weights $w_1 \ldots w_G$ it may become possible to ensure that a sufficient number of reference positions is selected providing a suitable geometry and enabling a suitable combination of representative directions from respective reference positions to a locator whose orientation and/or position is estimated.

As exemplarily illustrated in FIG. 3, if for a group of reference points selected in advance to performing steps 301 and 303, quality metric QM is determined to be satisfactory (e.g. yields a value above a predefined threshold), the method proceeds to step 307. Otherwise, some reference positions (e.g. reference positions that may have been individually been determined to yield unsatisfactory results) or all reference positions of the group of reference positions may be exchanged by new reference positions. In this case, the method then returns to the beginning and steps 301 to 305 may then be performed based on newly selected reference points.

In a step 305, the first apparatus may then obtain a position and/or an orientation of locator 6 (of a node of the communication network). Thus, the first apparatus may be configured for obtaining information indicative at least of an orientation and/or position of the node of the communication network at least based on the weighted estimate of the representative direction obtained for the at least one reference position.

For example, the position and/or orientation of locator 6 may be obtained based on respective estimates of representative directions $\hat{u}_1 \ldots \hat{u}_G$ from locator 6 to one or more corresponding reference positions $p_1$ to $p_G$ and based on respective weights $w_1 \ldots w_G$ for corresponding representative directions. In an exemplary embodiment, the method according to the first aspect comprises and/or the first apparatus is configured for:

obtaining information indicative at least of a position of the node of the communication network at least based on the weighted estimate of the representative direction obtained for the at least one reference position and based on a two-dimensional grid and information on at least one spatial coordinate, e.g. a height, of the node of the communication network or based on a three-dimensional grid.

In other words, respective positions of one or more locators (e.g. locators 6.1 and 6.2 of FIG. 1) may be estimated using a 3D grid search, or a 2D grid search if one spatial coordinate, e.g. a height, of a respective locator is known. In an exemplary embodiment, respective orientations corresponding to respective ones of the grid points may then be estimated in closed-form. Based thereon, a method according to an exemplary embodiment of the first aspect may enable provision of a 3D pose solution (e.g. as a pair of position-orientation) at respective ones of the grid points.

For example, respective grid points of a 3D grid G may be represented as $g^{x,y,z}$, whereby the grid points may be defined within a volume covering a position of locator 6 and corresponding reference positions, e.g. reference positions 3.1 to 3.G, e.g. 3.1 to 3.4 as exemplarily illustrated in FIG. 1. Grid G may thus be used for searching a position of locator 6 and for determining its orientation, whereby a step of a corresponding grid search may be referred to as $\Delta_x$, $\Delta_y$, $\Delta_z$. In an exemplary embodiment, a respective step of the grid search is defined to be smaller than a positioning error expected based on system 100, e.g. 10 to 100 times smaller. Further, a unit vector in the map reference system representative of an estimated direction from locator 6, whose position $\hat{l}$ is to be estimated, to reference position $p_g$ may be represented as $$\hat{v}_g = \frac{p_g - l}{\|p_g - \hat{l}\|}.$$

A candidate unit vector can then be estimated for a respective one of the points of grid $\mathbb{G}$ with $\hat{l}$ taking values of the point on the grid, e.g.

$$\hat{l}^{x,y,z} = g^{x,y,z}, \forall g^{x,y,z} \in \mathbb{G}.$$

For a respective point $\hat{l}^{x,y,z}$, an orientation of locator 6 may then be estimated by matching a respective candidate unit vector $v_g^{x,y,z}$ representative of the direction from locator 6 to reference position $p_g$, based on a relation between the estimated representative direction $\hat{u}_g$ in the locator frame and the unknown orientation $\Omega^{x,y,z}$ of locator 6:

$$v_g^{x,y,z} = \hat{\Omega}^{x,y,z} \hat{u}_g.$$

Based on estimated representative directions $\hat{u}_1, \ldots, \hat{u}_G$ for corresponding reference positions $p_1, \ldots, p_G$ and based on corresponding weights $w_1, \ldots, w_G$, an orientation that matches best all of candidate unit vectors $v_g^{x,y,z}, \ldots v_G^{x,y,z}$ with the estimated representative directions $\hat{u}_1, \ldots, \hat{u}_G$ may be determined by solving the equation $$[v_1^{x,y,z}, \ldots, v_G^{x,y,z}] = \hat{\Omega}^{x,y,z} [\hat{u}_1, \ldots, \hat{u}_G] \text{diag}\{w_1, \ldots, w_G\}.$$

The orientation estimate may then be derived as $$\hat{\Omega}^{x,y,z} = UV^T$$

where the matrices U, V may be obtained by singular value decomposition (SVD) and represent the left and right singular vectors in the following decomposition:

$$[\hat{u}_1, \ldots, \hat{u}_G] \text{diag}\{w_1, \ldots, w_G\} [v_1^{x,y,z}, \ldots, v_G^{x,y,z}]$$
$$T = U\Sigma V^T.$$

For a respective one of the grid points, a candidate locator pose estimate $(\hat{l}^{x,y,z}, \hat{\Omega}_{x,y,z})$ may exist, where $\hat{l}^{x,y,z}$ may represent a tentative position estimate of locator 6, and where $\hat{\Omega}_{x,y,z}$ may represent a tentative orientation estimate of locator 6. The estimated 3D pose of locator 6 may then be selected to be the position and orientation pair that minimizes a calibration criterion across the entire grid $\mathbb{G}$. The calibration criterion may correspond to or comprise a weighted combination of point-to-line distances, where a point may corresponds to a grid point $g^{x,y,z}$ (e.g. a candidate locator position $\hat{l}^{x,y,z}$), while a line may correspond to directions emanating from a given grid point $g^{x,y,z}$ towards a respective reference position (involving the candidate orientation $\hat{\Omega}^{x,y,z}$).

Referring back to FIG. 2, a distance from a reference position to a line representing an estimated representative direction in the map frame, which such distances being indicated by dashed lines in FIG. 2, may be represented as $d(p_g, v_g^{x,y,z})$. Based thereon, in an exemplary embodiment, a calibration quality criterion to be minimized may then be defined as a weighted mean of such distances for a group of reference positions $p_1$ to $p_G$ as Q(x, y, z):

$$Q(x,y,z) = 1/G \Sigma_{g=1}^G d(p_g, v_g^{x,y,z}).$$

Further, based thereon, in an exemplary embodiment, an orientation and position of locator 6 (a node of the communication network) may then be obtained as position-orientation pair $(\hat{l}^{x,y,z}, \Omega^{x,y,z})$ that minimizes said calibration quality criterion over grid $\mathbb{G}$:

$$(\hat{l}, \hat{\Omega}) = \underset{x,y,z}{\operatorname{argmin}} Q(x, y, z).$$

Referring back to FIG. 3, in an optional step 309, in an exemplary embodiment, the first apparatus may be configured to determine whether or not the obtained orientation and/or position is reliable, e.g. whether or not the calibration yields satisfactory results.

For example, a quality of the calibration may be verified by using the calibration criterion Q also employed in step 307. For example, if a weighted mean of point-to-line distances d (dashed lines in FIG. 2) is unsatisfactory (is e.g. below a predefined threshold), the method according to the first aspect, e.g. a method following flowchart 300 may be performed based on more reference positions. If otherwise, calibration is considered satisfactory, the estimated pose of the locator may be used by system 100 to locate and/or track users.

Figure 4:
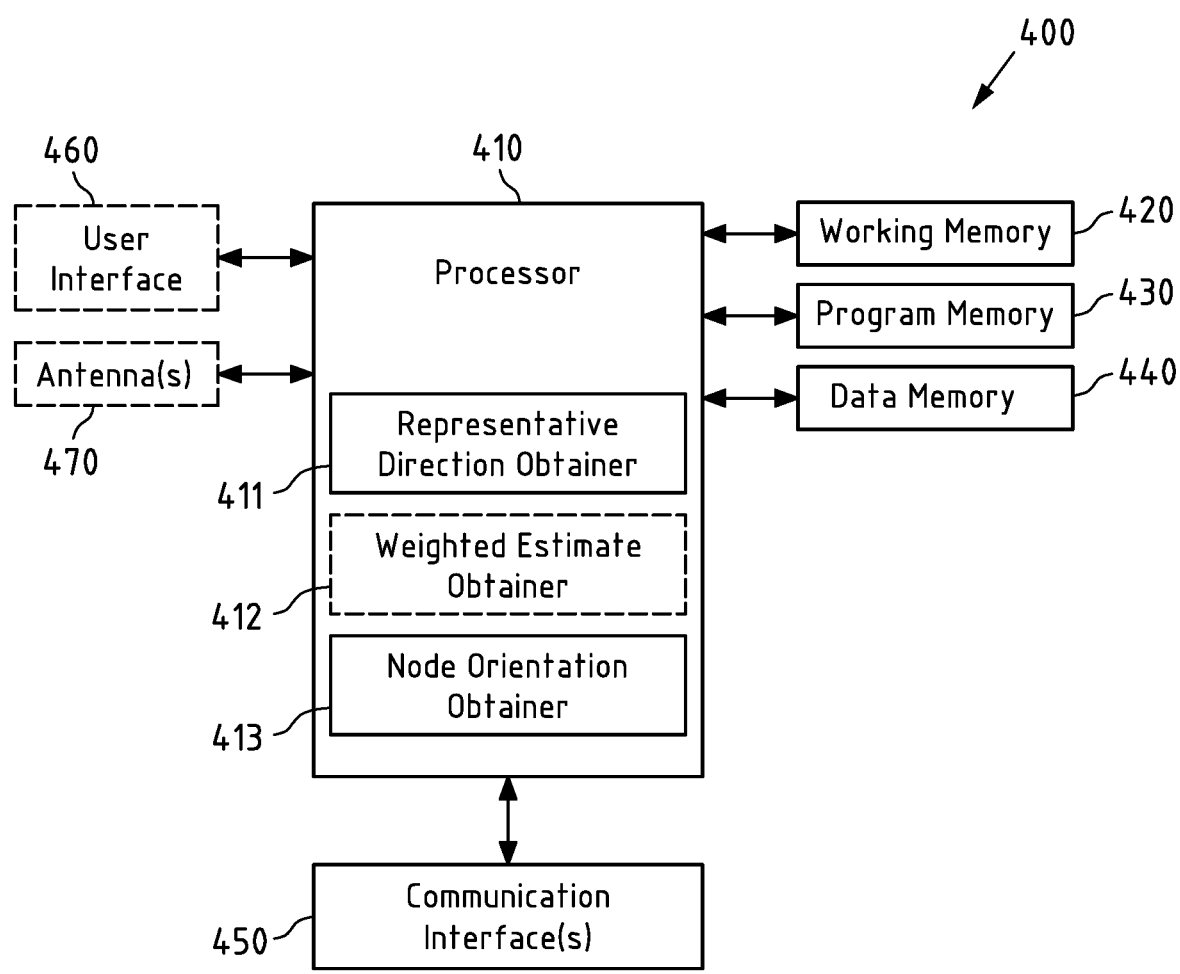
FIG. 4 a schematic block diagram of an apparatus configured to perform the method according to the first exemplary aspect.

FIG. 4 is a schematic block diagram of an apparatus 400 according to an exemplary aspect of the present invention, which may for instance represent the LMF and/or LMC (e.g. part of the positioning server 4) of FIG. 1.

Apparatus 400 comprises a processor 410, working memory 420, program memory 430, data memory 440, communication interface(s) 450, and an optional user interface 460 and at least two antennas 470. The at least two antennas 470 may be part of an antenna panel, e.g. part of a phased antenna array. Also, at least two of such antenna panels may be comprised by or connectable to the apparatus 400.

Apparatus 400 may for instance be configured to perform and/or control or comprise respective means (at least one of 410 to 460) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect.

Processor 410 may for instance comprise a representative direction obtainer 411 as a functional and/or structural unit. Representative direction obtainer 411 may for instance be configured to obtain (e.g. receive or retrieve from a memory, e.g. data memory 440) one or more representative directions from a node of a communication network to one or more reference positions.

Processor 410 may for instance comprise an optional weighted estimate obtainer 412 as a functional and/or structural unit. Weighted estimate obtainer 412 may for instance be configured to obtain (e.g. receive or retrieve from a memory, e.g. data memory 440) one or more weighted estimates of corresponding one or more representative directions.

Processor 410 may for instance comprise an node orientation obtainer 413 as a functional and/or structural unit. Node orientation determiner 413 may for instance be configured to obtain information indicative at least of an orientation of a node of the communication network.

Processor 410 may for instance further control the memories 420 to 440, the communication interface(s) 450, and the optional user interface 460.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store information, such as directional measurements, sample measurements, orientation information of the node of the communication network, or the like, to name but a few non-limiting examples.

Communication interface(s) 450 enable apparatus 400 to communicate with other entities, e.g. of system 100 of FIG. 1. The communication interface(s) 450 may for instance comprise a wireless interface, e.g. a cellular radio communication interface and/or a WLAN interface and/or wirebound interface, e.g. an IP-based interface, for instance to communicate with entities via the Internet. Communication interface(s) may enable apparatus 400 to communicate with other entities e.g. not shown in FIG. 1.

User interface 460 is optional and may comprise a display for displaying information to a user and/or an input device (e.g. a keyboard, keypad, touchpad, mouse, and/or control device for maneuvering the apparatus in case it is an AGV, etc.) for receiving information from a user.

Some or all of the components of the apparatus 400 may for instance be connected via a bus. Some or all of the components of the apparatus 400 may for instance be combined into one or more modules.

Figure 5:
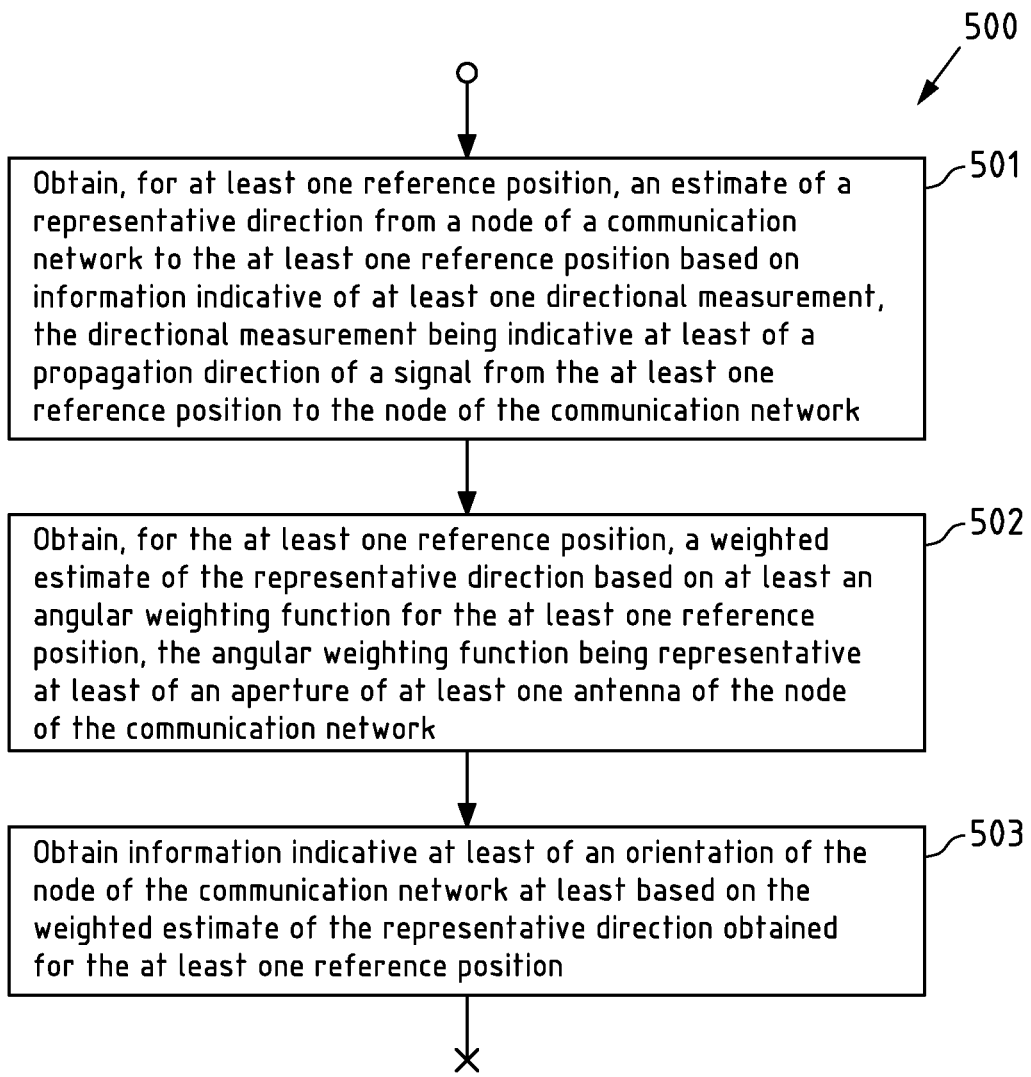
FIG. 5 is a flowchart illustrating an example of a method according to the first aspect of the invention.

FIG. 5 is a flowchart 500 illustrating an example of a method according to the first aspect of the invention. Without limiting the scope of the invention, it is assumed in the following that apparatus 400 as disclosed above with respect to FIG. 4 (an example of the first apparatus), which may in an exemplary embodiment correspond to or be part of positioning server 4 of FIG. 1, performs the steps of flowchart 500. It is to be understood that any step of flowchart 500 may be performed by any one or more than one apparatus.

In a step 501, apparatus 400 obtains (e.g. representative direction obtainer 411 of processor 410 obtains) for at least one reference position, an estimate of a representative direction from a node of a communication network (e.g. from a respective one of nodes 6.1, 6.2 of FIG. 1) to the at least one reference position (e.g. to a respective one of reference positions I to IV of FIG. 1) based on information indicative of at least one directional measurement, the directional measurement being indicative at least of a propagation direction of a signal from the at least one reference position to the node of the communication network.

Further, in a step 502, apparatus 400 obtains (e.g. weighted estimate obtainer 412 of processor 410 obtains) for the at least one reference position (e.g. for a respective one of reference positions I to IV of FIG. 1), a weighted estimate of the representative direction based on at least an angular weighting function for the at least one reference position, the angular weighting function being representative at least of an aperture of at least one antenna of the node of the communication network.

In a step 503, apparatus 400 obtains (e.g. node orientation obtainer 411 of processor 410 obtains) information indicative at least of an orientation (e.g. of a 3D orientation represented or representable by a 3×3 orthogonal matrix Ω as disclosed above) of the node of the communication network at least based on the weighted estimate of the representative direction obtained for the at least one reference position.

Figure 6:
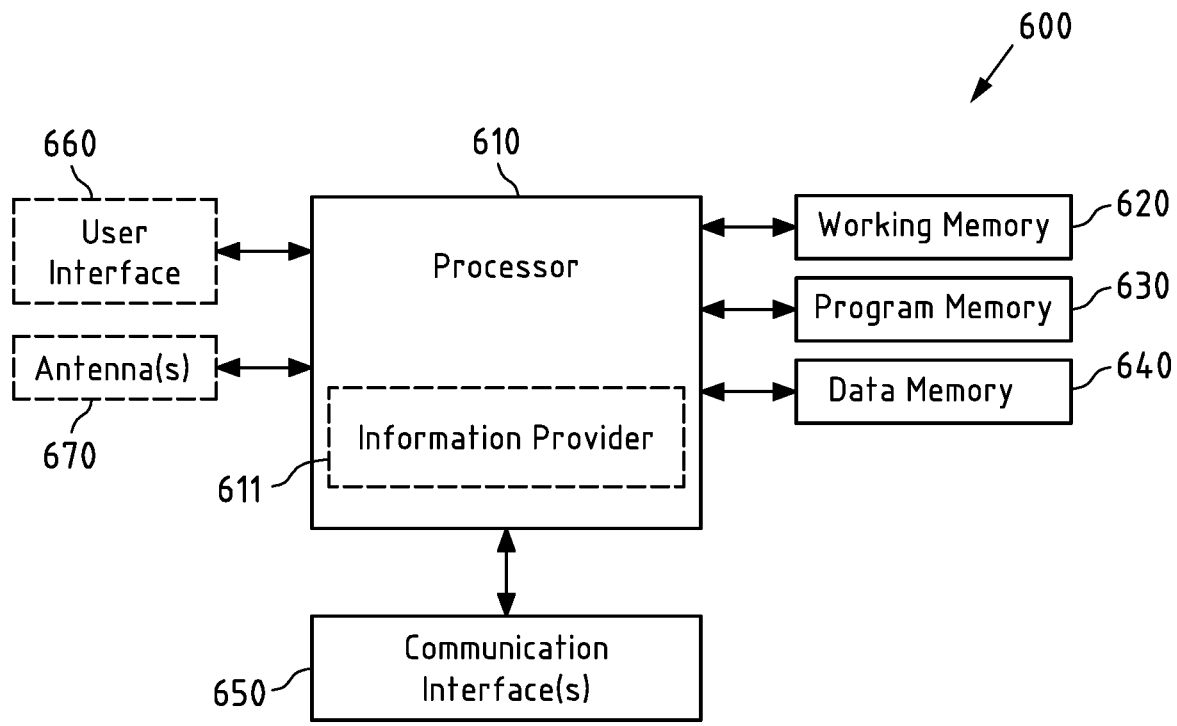
FIG. 6 a schematic block diagram of an apparatus configured to perform the method according to the second exemplary aspect.

FIG. 6 is a schematic block diagram of an apparatus 600 according to an exemplary aspect of the present invention, which may for instance represent the second apparatus, e.g. a device comprising any one of reference antennas 3.1 to 3.4 of FIG. 1.

Apparatus 600 comprises a processor 610, working memory 620, program memory 630, data memory 640, communication interface(s) 650, an optional user interface 660 and at least one antenna 670. While the at least one antenna 670 may be part of an antenna panel, it may be sufficient for performing e.g. a method according to the second aspect that an apparatus according to the second aspect comprises or is connected to a single antenna configured for non-directed transmission.

Apparatus 600 may for instance be configured to perform and/or control or comprise respective means (at least one of 610 to 670) for performing and/or controlling the method according to the second exemplary aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the second exemplary aspect.

Processor 610 may for instance comprise an information provider 611 as a functional and/or structural unit. Information provider 611 may for instance be configured for providing information for causing a first apparatus to perform a method according to the first aspect. Such information may in an exemplary embodiment in particular correspond to or comprise at least one of position information of the reference position, position information of the second apparatus, identification information of the second apparatus, at least one reference signal for enabling determination of a signal quality.

Processor 610 may for instance further control the memories 620 to 640, the communication interface(s) 650, the optional user interface 660 and the antennas 670.

Processor 610 may for instance execute computer program code stored in program memory 630, which may for instance represent a computer readable storage medium comprising program code that, when executed by processor 610, causes the processor 610 to perform the method according to the second exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store information, such as capability information, sample measurements, orientation information, or the like, to name but a few non-limiting examples.

Communication interface(s) 650 enable apparatus 600 to communicate with other entities, e.g. of system 100 of FIG. 1. The communication interface(s) 650 may for instance comprise a wireless interface, e.g. a cellular radio communication interface and/or a WLAN interface and/or wirebound interface, e.g. an IP-based interface, for instance to communicate with entities via the Internet. Communication interface(s) may enable apparatus 600 to communicate with other entities e.g. not shown in FIG. 1.

User interface 660 is optional and may comprise a display for displaying information to a user and/or an input device (e.g. a keyboard, keypad, touchpad, mouse, and/or control device for maneuvering the apparatus in case it is an IOT device and/or AGV device, etc.) for receiving information from a user.

Some or all of the components of the apparatus 600 may for instance be connected via a bus. Some or all of the components of the apparatus 600 may for instance be combined into one or more modules.

Figure 7:
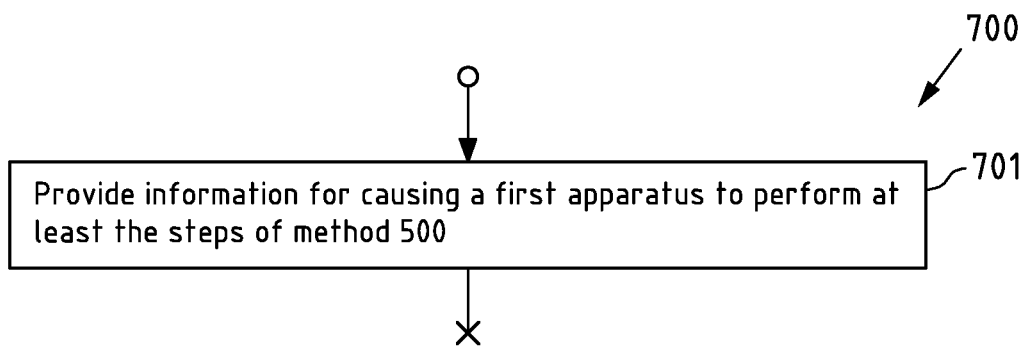
FIG. 7 is a flowchart illustrating an example of a method according to the first aspect of the invention.

FIG. 7 is a flowchart 700 illustrating an example of a method according to the first aspect of the invention. Without limiting the scope of the invention, it is assumed in the following that apparatus 600 as disclosed above with respect to FIG. 6 (an example of the second apparatus), which may in an exemplary embodiment correspond to or be part of a device comprising any one of reference antennas 3.1 to 3.4 of FIG. 1, performs the steps of flowchart 700. It is to be understood that any step of flowchart 700 may be performed by any one or more than one apparatus.

In a step 701, apparatus 600 provides (e.g. information provider 611 of processor 610 provides) information for causing a first apparatus to perform at least the steps of method 500, e.g. a method according to the first aspect. In other words, in a step 701, apparatus 600 provides (e.g. information provider 611 of processor 610 provides) information for causing a first apparatus to obtain, for at least one reference position, an estimate of a representative direction from a node of a communication network to the at least one reference position based on information indicative of at least one directional measurement, the directional measurement being indicative at least of a propagation direction of a signal from the at least one reference position to the node of the communication network;

obtain, for the at least one reference position, a weighted estimate of the representative direction based on at least an angular weighting function for the at least one reference position, the angular weighting function being representative at least of an aperture of at least one antenna of the node of the communication network; and obtaining information indicative at least of an orientation of the node of the communication network at least based on the weighted estimate of the representative direction obtained for the at least one reference position.

As disclosed further herein, the information may in an exemplary embodiment comprise or correspond to at least one of position information of the reference position, position information of the second apparatus, identification information of the second apparatus, at least one reference signal for enabling determination of a signal quality.

The following embodiments shall also be considered to be disclosed:

Embodiment 1

A first method performed and/or controlled by at least one apparatus, the method comprising:
obtaining, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;
obtaining, for the at least one reference position, a weighted estimate of the representative direction based on at least an angular weighting function for the at least one reference position, the angular weighting function being representative at least of an aperture of at least one antenna of the node of the communication network; and
obtaining information indicative at least of an orientation and/or position of the node of the communication network at least based on the weighted estimate of the representative direction obtained for the at least one reference position.

Embodiment 2

The method according to embodiment 1, wherein the signal communicated between the at least one reference position and the node of the communication network is at least one of:
a signal from the at least one reference position to the node of the communication network;
a signal from the node of the communication network to the at least one reference position.

Embodiment 3

The method according to any of embodiments 1 or 2, further comprising
obtaining information indicative at least of a three-dimensional orientation and/or a three-dimensional position of the node of the communication network at least based on the weighted estimate of the representative direction obtained for the at least one reference position.

Embodiment 4

The method according to any of embodiments 1 to 3, wherein the method is performed at least as part of a calibration process for calibrating a radio frequency (RF) based positioning and/or tracking system, in particular indoor positioning and/or tracking system.

Embodiment 5

The method according to any of embodiments 1 to 4, further comprising:
obtaining, for the at least one reference position, the information indicative of the at least one directional measurement, the at least one directional measurement being indicative at least of one of:
an Angle-of-Arrival, AoA, of a signal from the reference position at the node of the communication network;
an Angle-of-Departure, AoD, of a signal from the node of the communication network at the reference position.

Embodiment 6

The method according to any of embodiments 1 to 5, further comprising:
obtaining the information indicative of the at least one directional measurement via a wireless and/or wired communication path.

Embodiment 7

The method according to embodiment 6, wherein the wireless communication path corresponds to a communication path or link in a wireless communication network, in particular in a Wireless Local Area Network (WLAN) or a cellular network, whereby a cellular network is a mobile phone network like a 2G/3G/4G/5G/NR communication network, and wherein a wired communication path corresponds to a communication path or link in a wired communication network employing wire-based communication technology, and corresponds in particular to a telephone network connection, a cable television connection, an internet connection, a fiber-optic connection and/or an electromagnetic waveguide connection.

Embodiment 8

The method according to any of embodiments 1 to 7, wherein the first apparatus is part of and/or is in communication with a system comprising at least two nodes of a communication network, the at least two nodes forming nodes of an AoA and/or AoD positioning/tracking system.

Embodiment 9

The method according to any of embodiments 1 to 8, wherein obtaining a respective one of the at least one directional measurement is based on:

obtaining at least one sample measurement, wherein a respective sample measurement is indicative of one or more signals that are observed with at least one antenna, in particular at least two antennas, comprised by or connectable to the node of the communication network and/or a device positioned at the at least one reference position.

Embodiment 10

The method according to embodiment 9, wherein the at least one antenna is, in particular wherein the at least two antennas are, comprised by and/or form a phased array of a group of antennas, in particular of the node of the communication network.

Embodiment 11

The method according to any of embodiments 1 to 10, further comprising:
obtaining, for the at least one reference position, information indicative of at least one directional measurement, wherein a respective directional measurement is indicative at least of a propagation direction of a signal from the at least one reference position to the node of the communication network or at least of a propagation direction of a signal from the node of the communication network to the at least one reference position;
determining whether a respective is a Line-of-Sight, LOS, measurement or a Non-Line-of-Sight, NLOS, measurement;
obtaining, the estimate of the representative direction for the at least one reference position based on at least one directional measurement, if the at least one directional measurement is determined to be a LOS measurement.

Embodiment 12

The method according to any of embodiments 1 to 11, further comprising:
obtaining, the estimate of the representative direction for the at least one reference position not based on at least one directional measurement, if the at least one directional measurement is determined to be a NLOS measurement.

Embodiment 13

The method according to any of embodiments 11 or 12, further comprising:
obtaining, for the at least one reference position, information on at least one signal quality measurement, wherein a respective signal quality measurement is associated with a respective directional measurement and is indicative of a signal quality for the at least one reference position, Embodiment 14

The method according to embodiment 13, further comprising:
determining whether a signal quality measurement associated with a respective directional measurement is above or equal to a predefined signal quality threshold; and
obtaining, for the at least one reference position, the estimate of the representative direction from the node of the communication network to the at least one reference position based on the at least one directional measurement of the at least one directional measurement if the signal quality measurement associated with the at least one directional measurement is determined to be equal to or above the predefined signal quality threshold.

Embodiment 15

The method according to any of embodiments 11 to 14, wherein obtaining, for the at least one reference position, the estimate of the representative direction comprises:
obtaining at least one weighted directional measurements by applying a respective weighting function to a corresponding one of the at least one directional measurement,
obtaining the estimate of the representative direction based on the at least one weighted directional measurement,
wherein the weighting function is based on at least one of a median weight derived based on the at least two selected direction measurements and an angular weighting function.

Embodiment 16

The method according to embodiment 15, further comprising:
selecting at least one directional measurement if for a respective one directional measurement, a signal quality measurement associated with the respective directional measurement is above or equal to a predefined signal quality threshold; and
applying a respective weighting function to a respective selected directional measurement.

Embodiment 17

The method according to any of embodiments 1 to 16, further comprising:
determining whether or not the at least one reference position is reliable based on a quality metric determined based on at least one of the estimate of the representative direction obtained for the at least one reference position and a signal quality for the at least one reference position;
discarding the at least one reference position if the at least one reference position is determined to be not reliable.

Embodiment 18

The method according to any of embodiments 1 to 17, further comprising:
obtaining, for a same reference position of the at least one reference position, a respective estimate of a respective representative direction from at least two nodes of a communication network to the same reference position based on at least one directional measurement indicative at least of a propagation direction of a signal communicated between the same reference position and a respective one of the at least two nodes of the communication network.

Embodiment 19

The method according to any of embodiments 1 to 18, wherein the first apparatus is or is part of a location management function, LMF, located at a core network of the mobile communication network, and a location management component, LMC, located at a radio access network of the mobile communication network.

Embodiment 20

A second method performed and/or controlled by at least one apparatus, the method comprising:
providing information for causing a first apparatus to:
obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;
obtain, for the at least one reference position, a weighted estimate of the representative direction based on at least an angular weighting function for the at least one reference position, the angular weighting function being representative at least of an aperture of at least one antenna of the node of the communication network; and
obtain information indicative at least of an orientation and/or position of the node of the communication network at least based on the weighted estimate of the representative direction obtained for the at least one reference position.

Embodiment 21

The method according to embodiment 20, wherein the information for causing the first apparatus to perform comprises or corresponds to at least one of position information of the reference position, position information of the second apparatus, identification information of the second apparatus, at least one reference signal for enabling determination of a signal quality.

Embodiment 22

The method according to any of the embodiments 20 to 21, wherein providing the information for causing the first apparatus to perform comprises:
transmitting or causing of transmitting the information for causing the first apparatus to perform based on a signal reflecting a single antenna transmission characteristic.

Embodiment 23

The method according to any of embodiments 20 to 22, wherein the second apparatus is or is part of a mobile device, an automated guided vehicle, AGV, an Internet-of-Things, IoT device, or the node of the communication network.

Embodiment 24

A method, comprising:
providing, by at least one second apparatus, information for causing a first apparatus to:
obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;
obtain, for the at least one reference position, a weighted estimate of the representative direction based on at least an angular weighting function for the at least one reference position, the angular weighting function being representative at least of an aperture of at least one antenna of the node of the communication network;
obtain information indicative at least of an orientation and/or position of the node of the communication network at least based on the weighted estimate of the representative direction obtained for the at least one reference position;
obtaining, by the at least one first apparatus, for the at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;
obtaining, for the at least one reference position, a weighted estimate of the representative direction based on at least an angular weighting function for the at least one reference position, the angular weighting function being representative at least of an aperture of at least one antenna of the node of the communication network; and
obtaining information indicative at least of an orientation and/or position of the node of the communication network at least based on the weighted estimate of the representative direction obtained for the at least one reference position.

Embodiment 25

The method according to embodiment 24, wherein the at least one first apparatus is an apparatus configured for performing the method according to any of the claims 1 to 19 and the at least one second apparatus is an apparatus configured for performing the method according to any of the claims 12 to 23.

Embodiment 26

An apparatus configured to perform and/or control or comprising respective means for performing and/or controlling the method of any of the embodiments 1 to 19.

Embodiment 27

An apparatus configured to perform and/or control or comprising respective means for performing and/or controlling the method of any of the embodiments 20 to 23.

Embodiment 28

A tangible computer-readable medium storing computer program code, the computer program code when executed by a processor causing an apparatus to perform and/or control:
obtaining, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;

obtaining, for the at least one reference position, a weighted estimate of the representative direction based on at least an angular weighting function for the at least one reference position, the angular weighting function being representative at least of an aperture of at least one antenna of the node of the communication network; and obtaining information indicative at least of an orientation and/or position of the node of the communication network at least based on the weighted estimate of the representative direction obtained for the at least one reference position.

Embodiment 29

A tangible computer-readable medium storing computer program code, the computer program code when executed by a processor causing an apparatus to perform and/or control:

providing information for causing a first apparatus to:

obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;

obtain, for the at least one reference position, a weighted estimate of the representative direction based on at least an angular weighting function for the at least one reference position, the angular weighting function being representative at least of an aperture of at least one antenna of the node of the communication network; and obtain information indicative at least of an orientation and/or position of the node of the communication network at least based on the weighted estimate of the representative direction obtained for the at least one reference position.

Embodiment 30

A tangible computer-readable medium storing computer program code, the computer program code when executed by a processor causing an apparatus to perform and/or control:

providing, by at least one second apparatus, information for causing a first apparatus to:

obtain, for at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;

obtain, for the at least one reference position, a weighted estimate of the representative direction based on at least an angular weighting function for the at least one reference position, the angular weighting function being representative at least of an aperture of at least one antenna of the node of the communication network;

obtain information indicative at least of an orientation and/or position of the node of the communication network at least based on the weighted estimate of the representative direction obtained for the at least one reference position;

obtaining, by the at least one first apparatus, for the at least one reference position, an estimate of a representative direction from a node of a communication network to the at least one reference position based on information indicative of at least one directional measurement, the directional measurement being indicative at least of a propagation direction of a signal communicated between the at least one reference position and the node of the communication network;

obtaining, for the at least one reference position, a weighted estimate of the representative direction based on at least an angular weighting function for the at least one reference position, the angular weighting function being representative at least of an aperture of at least one antenna of the node of the communication network; and obtaining information indicative at least of an orientation and/or position of the node of the communication network at least based on the weighted estimate of the representative direction obtained for the at least one reference position.

Example embodiments may thus be utilized to enable enhancements and solutions necessary to support high accuracy (e.g. horizontal and/or vertical), low latency, network efficiency (scalability, RS overhead, etc.) and device efficiency (power consumption, complexity) requirements for commercial uses cases (including general commercial use cases and specifically (I)IoT use cases. In particular, example embodiments according to all exemplary aspects enable a mechanism for determine a node's heading (represented by respective information indicative at least of an orientation) with an accuracy better than 30 degrees (0.54 rad) and a positioning service availability of 99.9% for static users and with an accuracy better than 10 degrees (0.17 rad) and a positioning service availability of 99% for users up to 10 km/h."

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of one of the enumerated features is possible. The specific combination of all subsequently enumerated features may as well be considered. Also, a plurality of one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A first apparatus comprising at least one processor and at least one memory including computer program code, the at least one memory and the computer program code configured to, with the at least one processor, cause the first apparatus to at least perform:
    selecting a plurality of reference positions based on at least one criteria, wherein the at least one criteria comprises at least one of the following: directions based on a performance level of an antenna or an antenna array of a node of a communication network; a signal quality of a signal from a respective reference position among the plurality of reference positions; or a spread within an angular range corresponding to an aperture of the antenna or the antenna array of the node of the communication network;
    obtaining, for each of the plurality of reference positions, an estimate of a representative direction from the node of the communication network to the respective reference position among the plurality of reference positions based on information indicative of at least one directional measurement, the directional measurement being indicative at least of a propagation direction of a signal communicated between the respective reference position among the plurality of reference positions and the node of the communication network;
    obtaining, for each of the plurality of reference positions, a weighted estimate of the representative direction based on at least an angular weighting function for the respective reference position among the plurality of reference positions;
    obtaining information indicative of at least one of a 3-D orientation and a 3-D position of the node of the communication network at least based on the weighted estimate of the representative direction obtained for each of the plurality of reference positions; and
    tracking or locating users based on at least one of the 3-D orientation and the 3-D position of the node of the communication network.

2. The first apparatus according to claim 1, the at least one memory and the computer program code configured to, with the at least one processor, cause the first apparatus to further perform:
    obtaining, for each of the plurality of reference positions, the information indicative of the at least one directional measurement, the at least one directional measurement being indicative of at least one of:
    an Angle-of-Arrival, AoA, of a signal from the reference position at the node of the communication network; or
    an Angle-of-Departure, AoD, of a signal from the node of the communication network at the reference position.

3. The first apparatus according to claim 2, wherein obtaining a respective one of the at least one directional measurement is based on:
    obtaining at least one sample measurement, wherein a sample measurement is indicative of one or more signals that are observed with at least one antenna comprised by or connectable to at least one of the node of the communication network or a device positioned at the respective reference position among the plurality of reference positions.

4. The first apparatus according to claim 1, the at least one memory and the computer program code configured to, with the at least one processor, cause the first apparatus to further perform:
    obtaining, for each of the plurality of reference positions, information indicative of at least one directional measurement, wherein a respective directional measurement is indicative at least of a propagation direction of a signal communicated between the respective reference position among the plurality of reference positions and the node of the communication network;
    determining whether the at least one directional measurement is a Line-of-Sight, LOS, measurement or a Non-Line-of-Sight, NLOS, measurement;
    obtaining, the estimate of the representative direction for each of plurality of reference positions based on at least one directional measurement, in response to the at least one directional measurement being determined to be a LOS measurement.

5. The first apparatus according to claim 4, the at least one memory and the computer program code configured to, with the at least one processor, cause the first apparatus to further perform:
    obtaining, for each of the plurality reference positions, information at least on one signal quality measurement, wherein a respective signal quality measurement is associated with a respective directional measurement and is indicative of a signal quality for the respective reference position among the plurality of reference positions,
    determining whether a signal quality measurement associated with a respective directional measurement is above or equal to a predefined signal quality threshold; and obtaining, for each of the plurality of reference positions, the estimate of the representative direction from the node of the communication network to the respective reference position among the plurality of reference positions based on the at least one directional measurement in response to the signal quality measurement associated with the at least one directional measurement being determined to be equal to or above the predefined signal quality threshold.

6. The first apparatus according to claim 4 wherein obtaining, for each of the plurality of reference positions, the estimate of the representative direction comprises:
  obtaining at least one weighted directional measurement by applying a respective weighting function to a corresponding one directional measurement,
  obtaining the estimate of the representative direction based on the at least one weighted directional measurement,
  wherein the weighting function is based on at least one of a median weight derived based on the at least one selected direction measurement or an angular weighting function.

7. The first apparatus according to claim 6, the at least one memory and the computer program code configured to, with the at least one processor, cause the first apparatus to further perform:
  selecting at least two directional measurements in response to a signal quality measurement associated with a respective one of the at least two selected directional measurements being above or equal to a predefined signal quality threshold; and
  applying the weighting function to the at least two selected directional measurements.

8. The first apparatus according to claim 1, the at least one memory and the computer program code configured to, with the at least one processor, cause the first apparatus to further perform:
  determining whether or not each of the plurality of reference positions is reliable based on a quality metric determined based on at least one of the estimate of the representative direction obtained for the respective reference position among the plurality of reference positions or a signal quality for the at least one reference position;
  discarding the respective reference position among the plurality of reference positions in response to the respective reference position being determined to be not reliable; and
  calibrating at least one of the 3-D orientation and 3-D position of the node of the communication network based on the quality metric.

9. The first apparatus according to claim 1, wherein the first apparatus is or is part of a location management function, LMF, located at a core network of the mobile communication network, and a location management component, LMC, located at a radio access network of the mobile communication network.

10. A second apparatus comprising at least one processor and at least one memory including computer program code, the at least one memory and the computer program code configured to, with the at least one processor, cause the second apparatus to at least perform:
  providing information for causing a first apparatus to:
    select a reference position of the second apparatus based on at least one criteria, wherein the at least one criteria comprises at least one of the following: directions based on a performance level of an antenna or an antenna array of a node of a communication network; a signal quality of a signal from the reference position; or a spread within an angular range corresponding to an aperture of the antenna or the antenna array of the node of the communication network
    obtain, for the reference position of the second apparatus, an estimate of a representative direction from the node of the communication network to the reference position based on information indicative of at least one directional measurement, the directional measurement being indicative at least of a propagation direction of a first signal communicated between the reference position and the node of the communication network;
    obtain, for the reference position, a weighted estimate of the representative direction based on at least an angular weighting function for the reference position;
    obtain information indicative of at least one of a 3-D orientation and a 3-D position of the node of the communication network at least based on the weighted estimate of the representative direction obtained for the reference position; and
    tracking or locating users based on at least one of the 3-D orientation and 3-D position of the node of the communication network.

11. The second apparatus according to claim 10, wherein the provided information comprises at least one of position information of the reference position, position information of the second apparatus, identification information of the second apparatus, or at least one reference signal for enabling determination of a signal quality.

12. The second apparatus according to any claim 10, wherein the second apparatus is or is part of a mobile device, an automated guided vehicle, AGV, an Internet-of-Things, IOT device, or the node of the communication network.

13. A method comprising:
  selecting a plurality of reference positions based on at least one criteria, wherein the at least one criteria comprises at least one of the following: directions based on a performance level of an antenna or an antenna array of a node of a communication network; a signal quality of a signal from a respective reference position among the plurality of reference positions; or a spread within an angular range corresponding to an aperture of the antenna or the antenna array of the node of the communication network
  obtaining, by a first apparatus, for each of the plurality of reference positions, an estimate of a representative direction from the node of the communication network to the respective reference position among the plurality of reference positions based on information indicative of at least one directional measurement, the directional measurement being indicative at least of a propagation direction of a signal communicated between the respective reference position among the plurality of reference positions and the node of the communication network;
  obtaining, by the first apparatus, for the each of the plurality of reference positions, a weighted estimate of the representative direction based on at least an angular weighting function for the respective reference position among the plurality of reference positions;
  obtaining, by the first apparatus, information indicative of at least one of a 3-D orientation and a 3-D position of the node of the communication network at least based on the weighted estimate of the representative direction obtained for each of the plurality of reference positions; and tracking or locating users based on at least one of the 3-D orientation and the 3-D position of the node of the communication network.

14. The method according to claim 13 further comprising:
obtaining, by the first apparatus, for each of the plurality of reference positions, the information indicative of the at least one directional measurement, the at least one directional measurement being indicative of at least of one of:
an Angle-of-Arrival, AoA, of a signal from the reference position at the node of the communication network;
an Angle-of-Departure, AoD, of a signal from the node of the communication network at the reference position.

15. The method according to claim 14, wherein obtaining a respective one of the at least one directional measurement is based on:
obtaining, by the first apparatus, at least one sample measurement, wherein a sample measurement is indicative of one or more signals that are observed with at least one antenna comprised by or connectable to at least one of the node of the communication network or a device positioned at the respective reference position among the plurality of reference positions.

16. The method according to claim 13 further comprising:
obtaining, by the first apparatus, for each of the plurality of reference positions, information indicative of at least one directional measurement, wherein a respective directional measurement is indicative at least of a propagation direction of a signal communicated between the respective reference position among the plurality of reference positions and the node of the communication network;
determining, by the first apparatus, whether the at least one directional measurement is a Line-of-Sight, LOS, measurement or a Non-Line-of-Sight, NLOS, measurement;
obtaining, by the first apparatus, the estimate of the representative direction for the respective reference position among the plurality of reference positions based on at least one directional measurement, in response to the at least one directional measurement being determined to be a LOS measurement.

17. The method according to claim 16 further comprising:
obtaining, by the first apparatus, for the each of the plurality of reference positions, information at least on one signal quality measurement, wherein a respective signal quality measurement is associated with a respective directional measurement and is indicative of a signal quality for the respective reference position among the plurality of reference positions,
determining, by the first apparatus, whether a signal quality measurement associated with a respective directional measurement is above or equal to a predefined signal quality threshold; and
obtaining, by the first apparatus, for each of the plurality of reference positions, the estimate of the representative direction from the node of the communication network to the respective reference position among the plurality of reference positions based on the at least one directional measurement in response to the signal quality measurement associated with the at least one directional measurement being determined to be equal to or above the predefined signal quality threshold.

18. The method according to claim 16 further comprising:
obtaining, by the first apparatus, at least one weighted directional measurement by applying a respective weighting function to a corresponding one directional measurement,
obtaining, by the first apparatus, the estimate of the representative direction based on the at least one weighted directional measurement,
wherein the weighting function is based on at least one of a median weight derived based on the at least one selected direction measurement or an angular weighting function.

19. The method according to claim 18 further comprising:
selecting at least two directional measurements in response to a signal quality measurement associated with a respective one of the at least two selected directional measurements being above or equal to a predefined signal quality threshold; and
applying, by the first apparatus, the weighting function to the at least two selected directional measurements.

* * * * *